United States Patent
Maki et al.

(10) Patent No.: US 11,616,619 B2
(45) Date of Patent: Mar. 28, 2023

(54) TRANSMITTER, RECEIVER, TRANSMISSION METHOD, AND RECEPTION METHOD

(71) Applicant: Panasonic Intellectual Property Corporation of America, Torrance, CA (US)

(72) Inventors: Shotaro Maki, Tokyo (JP); Takashi Iwai, Ishikawa (JP); Ayako Horiuchi, Kanagawa (JP); Ankit Bhamri, Hessen (DE); Yoshihiko Ogawa, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 161 days.

(21) Appl. No.: 17/255,917

(22) PCT Filed: Aug. 26, 2019

(86) PCT No.: PCT/JP2019/033390
§ 371 (c)(1),
(2) Date: Dec. 23, 2020

(87) PCT Pub. No.: WO2020/059438
PCT Pub. Date: Mar. 26, 2020

(65) Prior Publication Data
US 2021/0273759 A1    Sep. 2, 2021

(30) Foreign Application Priority Data
Sep. 21, 2018   (JP) .............................. JP2018-177051

(51) Int. Cl.
*H04W 4/00* (2018.01)
*H04L 5/00* (2006.01)

(52) U.S. Cl.
CPC .................................. *H04L 5/0048* (2013.01)

(58) Field of Classification Search
CPC ... H04L 5/0048; H04L 1/0009; H04L 1/0016; H04L 1/0021; H04L 1/0003; H04L 1/0041; H04L 1/0045; H04L 27/26
(Continued)

(56) References Cited

U.S. PATENT DOCUMENTS

2020/0229034 A1*  7/2020  Xu .......................... H04W 28/06
2021/0037518 A1*  2/2021  Moroga ................ H04L 5/0048
2021/0044402 A1*  2/2021  Gao ...................... H04L 5/0048

FOREIGN PATENT DOCUMENTS

CN      110855406 B  *  5/2022  .......... H04L 1/0003
WO   WO-2020003543 A1 *  1/2020

OTHER PUBLICATIONS

3GPP TS 38.214 V15.2.0, "3rd Generation Partnership Project; Technical Specification Group Radio Access Network; NR; Physical layer procedures for data (Release 15)," Jun. 2018, 95 pages.
(Continued)

*Primary Examiner* — Maharishi V Khirodhar
(74) *Attorney, Agent, or Firm* — Seed IP Law Group LLP

(57) ABSTRACT

Provided is a base station with which it is possible to appropriately arrange a reference signal. In a base station (100), a control unit (101) determines a second threshold value on the basis of a first threshold value used in determining the arrangement of a reference signal. A transmission unit (105) transmits the reference signal arranged on the basis of the second threshold value.

11 Claims, 17 Drawing Sheets

(58) Field of Classification Search
USPC .......................................................... 370/329
See application file for complete search history.

(56) References Cited

OTHER PUBLICATIONS

Ericsson, "On phase noise effects," R1-1612335, Agenda Item: 7.1.3.2, 3GPP TSG-RAN WG1 #87, Reno, Nevada, Nov. 14-18, 2016, 6 pages.
International Search Report, dated Oct. 15, 2019, for corresponding International Application No. PCT/JP2019/033390, 4 pages.
NTT Docomo, "Revision of SI: Study on New Radio Access Technology," RP-161596 (revision of RP-161214), Agenda Item: 9.2.2, 3GPP TSG RAN Meeting #73, New Orleans, Sep. 19-22, 2016, 7 pages.
NTT Docomo, Inc., "Maintenance for Reference signals and QCL," R1-1809139, Agenda Item: 7.1.2.4, 3GPP TSG RAN WG1 Meeting #94, Gothenburg, Sweden, Aug. 20-24, 2018, 18 pages.

\* cited by examiner

MCS index table 1

| MCS Index $I_{MCS}$ | Modulation Order $Q_m$ | Target code Rate R x [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

FIG. 1

MCS index table 2

| MCS Index $I_{MCS}$ | Modulation Order $Q_m$ | Target code Rate $R$ x [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

FIG. 2

MCS index table 3

| MCS Index $I_{MCS}$ | Modulation Order $Q_m$ | Target code Rate $R$ x [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

FIG. 3

| Scheduled MCS | Time density ($L_{PT-RS}$) |
|---|---|
| $I_{MCS}$ < ptrs-MCS1 | PT-RS is not present |
| ptrs-MCS1 ≦ $I_{MCS}$ < ptrs-MCS2 | 4 |
| ptrs-MCS2 ≦ $I_{MCS}$ < ptrs-MCS3 | 2 |
| ptrs-MCS3 ≦ $I_{MCS}$ < ptrs-MCS4 | 1 |

MCS index table 2

| MCS Index $I_{MCS}$ | Modulation Order $Q_m$ | Target Code Rate R x [1024] | Spectral efficiency |
|---|---|---|---|
| 0 | 2 | 120 | 0.2344 |
| ... | ... | ... | ... |
| 10 | 4 | 658 | 2.5703 |
| 11 | 6 | 466 | 2.7305 |
| 12 | 6 | 517 | 3.0293 |
| ... | ... | ... | ... |
| 27 | 8 | 948 | 7.4063 | ptrs-MCS1 → (11)

PT-RS off / PT-RS On

MCS index table 3

| MCS Index $I_{MCS}$ | Modulation Order $Q_m$ | Target Code Rate R x [1024] | Spectral efficiency |
|---|---|---|---|
| 0 | 2 | 120 | 0.2344 |
| ... | ... | ... | ... |
| 10 | 2 | 308 | 0.6016 |
| 11 | 2 | 379 | 0.7402 |
| 12 | 2 | 449 | 0.8770 |
| ... | ... | ... | ... |
| 28 | 6 | 772 | 4.5234 |

| Scheduled MCS | Time density ($L_{PT-RS}$) |
|---|---|
| $I_{MCS}$ < ptrs-MCS1_U | PT-RS is not present |
| ptrs-MCS1_U ≦ $I_{MCS}$ < ptrs-MCS2_U | 4 |
| ptrs-MCS2_U ≦ $I_{MCS}$ < ptrs-MCS3_U | 2 |
| ptrs-MCS3_U ≦ $I_{MCS}$ < ptrs-MCS4 | 1 |

FIG. 13

| Scheduled MCS | Time density ($L_{PT-RS}$) |
|---|---|
| $I_{MCS}$ < ptrs-MCS1_U | 3 |
| ptrs-MCS1_U $\leqq$ $I_{MCS}$ < ptrs-MCS2_U | 2 |
| ptrs-MCS2_U $\leqq$ $I_{MCS}$ < ptrs-MCS4 | 1 |

FIG. 19

TRANSMITTER, RECEIVER, TRANSMISSION METHOD, AND RECEPTION METHOD

TECHNICAL FIELD

The present disclosure relates to a transmitter, a receiver, a transmission method, and a reception method.

BACKGROUND ART

A communication system called the fifth generation mobile communication system (5G) has been studied. Regarding 5G, studies have been conducted on flexibly providing functions for each use case requiring higher-speed communication traffic, an increase in the number of connected terminals, a high reliability, and/or a low latency are required. Typical traffic types corresponding to these use cases include enhanced Mobile Broadband (eMBB), massive Machine Type Communications (mMTC), and Ultra Reliable and Low Latency Communications (URLLC). The 3rd Generation Partnership Project (3GPP), an international standards-developing organization, has been studying development of communication systems in terms of both the LTE systems and Radio Access Technology (New RAT) (see, for example, Non-Patent Literature (hereinafter referred to as "NPL") 1).

CITATION LIST

Non-Patent Literature

NPL 1
RP-161596, "Revision of SI: Study on New Radio Access Technology," NTT DOCOMO, September 2016
NPL 2
R1-1612335, "On phase noise effects," Ericsson, November 2016
NPL 3
3GPP TR 38.214 V15.2.0, "NR Physical layer procedure for data (Release 15)" (2018-06)
NPL 4
R1-1809139, "Maintenance for Reference signals and QCL," NTT DOCOMO, August 2018

SUMMARY OF INVENTION

However, in New RAT, mapping methods for mapping reference signals have not been comprehensively studied.

One non-limiting and exemplary embodiment facilitates providing a transmitter, a receiver, a transmission method, and a reception method enabling suitable mapping of reference signals.

In an embodiment, the techniques disclosed here feature a transmitter including: control circuitry, which, in operation, determines a second threshold based on a first threshold used for determination of mapping of a reference signal; and transmission circuitry, which, in operation, transmits the reference signal mapped based on the second threshold.

In an embodiment, the techniques disclosed here feature a receiver including: control circuitry, which, in operation, determines a second threshold based on a first threshold used for determination of mapping of a reference signal; and reception circuitry, which, in operation, receives the reference signal mapped based on the second threshold.

In an embodiment, the techniques disclosed here feature a transmission method including: determining a second threshold based on a first threshold used for determination of mapping of a reference signal; and transmitting the reference signal mapped based on the second threshold.

In an embodiment, the techniques disclosed here feature a reception method including: determining a second threshold based on a first threshold used for determination of mapping of a reference signal; and receiving the reference signal mapped based on the second threshold.

Note that these generic or specific aspects may be achieved by a system, an apparatus, a method, an integrated circuit, a computer program, or a recoding medium, and also by any combination of the system, the apparatus, the method, the integrated circuit, the computer program, and the recoding medium.

According to an embodiment of the present disclosure, it is possible to map reference signals suitably.

Additional benefits and advantages of one aspect of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 1 illustrates exemplary MCS index table 1;
FIG. 2 illustrates exemplary MCS index table 2;
FIG. 3 illustrates exemplary MCS index table 3;
FIG. 4 illustrates an exemplary relationship between MCS and PT-RS time domain density;
FIG. 6 illustrates an exemplary method for determining PT-RS mapping density in a case where the same MCS threshold is used between different MCS index tables;
FIG. 13 illustrates an exemplary relationship between the MCS and the PT-RS time domain density according to Embodiment 1.

FIG. 19 illustrates an exemplary relationship between the MCS and the PT-RS time domain density according to another embodiment.

DESCRIPTION OF EMBODIMENTS

Figure 5:
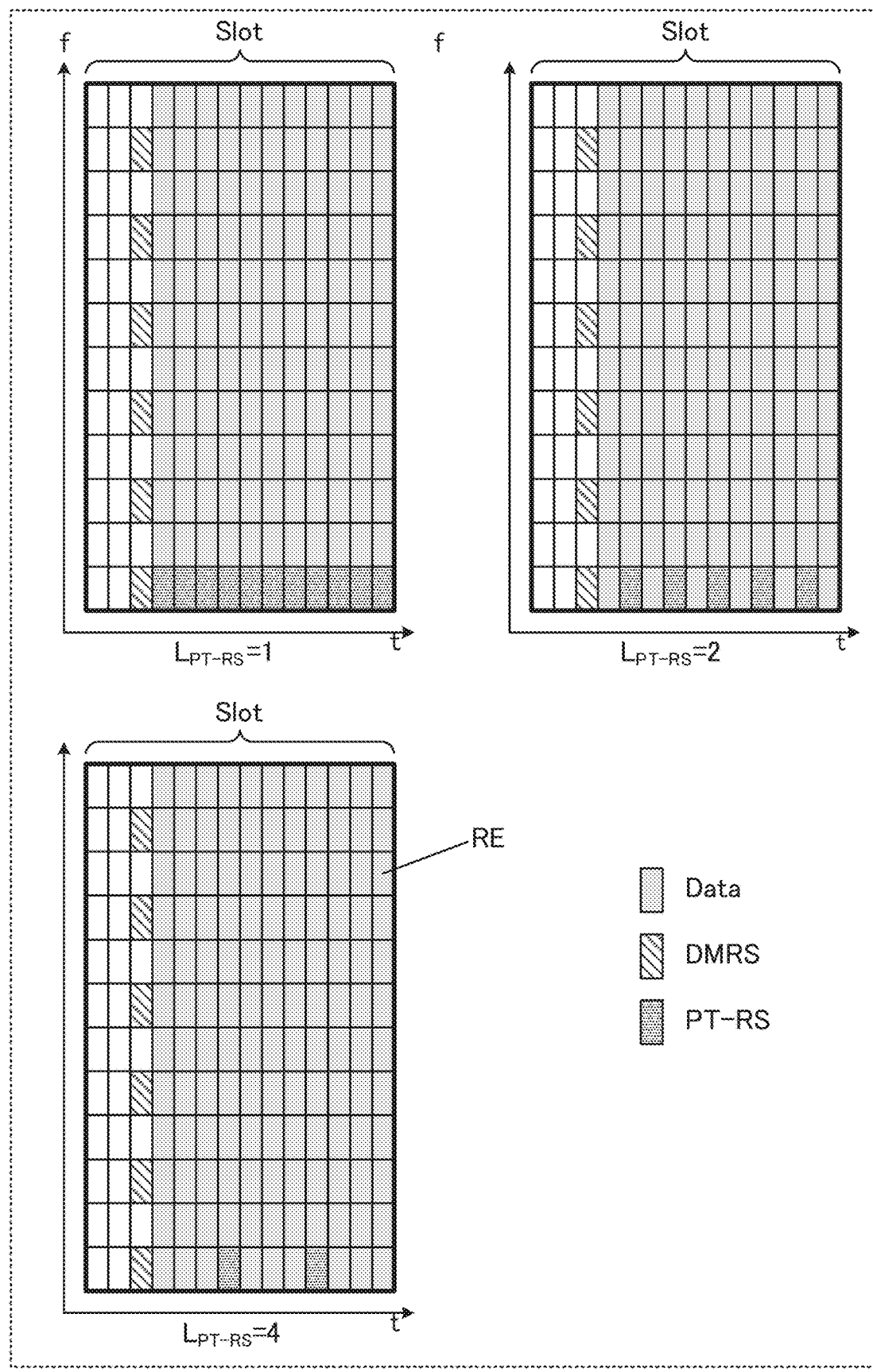
FIG. 5 illustrates an exemplary PT-RS mapping.

Hereinafter, embodiments of the present disclosure will be described in detail with reference to the accompanying drawings.

[Traffic Type and MCS Index Table]

New RAT assumes transmission and reception of data based on a plurality of traffic types such as eMBB, URLLC, and the like. For example, URLLC supports a Modulation and Coding Scheme (MCS; combination of a modulation scheme and a coding rate) with a Spectral Efficiency (SE) or a coding rate (or a target code rate) lower than that of an MCS expected to be used for eMBB in order to support higher reliability for transmission/reception data than in the case of eMBB. In other words, URLLC supports a conservative MCS that is more reliable than the MCS for eMBB.

Thus, regarding an "MCS index table" that is a list of MCSes (in other words, a table including a plurality of candidate MCSes), a plurality of tables different in the range of specifiable spectral efficiencies are prepared in New RAT. A base station (also referred to as gNB) and a mobile station (also referred to as a terminal or a User Equipment (UE)) are assumed to modulate or demodulate the data using one of the MCS index tables suitable for the traffic type of the data being transmitted and received.

FIGS. 1 to 3 illustrate three types of MCS index tables (MCS index table 1, MCS index table 2, and MCS index table 3) defined in NPL 3 as exemplary MCS index tables. The specifiable spectral efficiencies are relatively high in MCS index table 1 illustrated in FIG. 1 and MCS index table 2 illustrated in FIG. 2, while the specifiable spectral efficiencies or coding rates are relatively low in MCS index table 3 illustrated in FIG. 3. For example, MCS index table 1 and MCS index table 2 are assumed to be used primarily for eMBB, and MCS index table 3 is assumed to be used primarily for URLLC. However, the use of MCS index table 3 is not limited to the use for URLLC, and MCS index table 3 may also be used for eMBB.

Information indicating the type of the MCS index table to be referred to (one of MCS index tables 1 to 3) is configured for the mobile station, for example, by a higher layer signal (called higher layer signaling or higher layer parameter) from the base station. Further, information (for example, MCS index) indicating one of the MCSes listed in the MCS index table which is used for modulation or demodulation of data is dynamically indicated to the mobile station by, for example, Downlink Control Information (DCI). For example, the mobile station refers to the MCS index table configured by the higher layer signal to determine, from the MCS index indicated by the DCI, the MCS used for modulation or demodulation of the data.

However, it is assumed that the mobile station refers to (uses) a fixed MCS index table (e.g., MCS index table 3) regardless of the configuration by the higher layer signal in the case of modulation or demodulation of data of which the traffic type is URLLC. Therefore, the MCS index table configured for the mobile station by the higher layer signal may differ from the MCS index table actually referred to by the mobile station for modulation or demodulation.

Note that, in the following description, MCS indexes for which numerical values of the coding rate and the spectral efficiency are not specified (such as MCS indexes 29 to 31 of MCS index table 1 and MCS index table 3 and MCS indexes 28 to 31 of MCS index table 2) are referred to as "reserved MCS indexes." The reserved MCS indexes may be used, for example, for indication of retransmission in a hybrid automatic repeat request (HARD) process.

[PT-RS]

In New RAT, for example, signals having frequencies of 6 GHz or higher are used as carrier waves. In particular, when a higher frequency band and a higher modulation order are used, a Common Phase Error (CPE) or Inter-carrier Interference (ICI) caused by a phase noise of a local oscillator deteriorates error rate characteristics (e.g., see NPL 2).

To avoid this, in New RAT, it has been considered that a receiver performs CPE correction or ICI correction (which may hereinafter also be referred to as "CPE/ICI correction") using a Phase Tracking Reference Signal (PT-RS) in addition to channel equalization.

PT-RSs are mapped on the time axis more densely than Demodulation Reference Signals (DMRSs) used for channel estimation (for demodulation) in order to track the CPE/ICI fluctuating temporally at random. For example, it is assumed that the PT-RSs are mapped at a density of every symbol, one symbol in two adjacent symbols, one symbol in four adjacent symbols, or the like. This is referred to as "PT-RS time domain density."

The PT-RSs are mapped at a relatively low density in the frequency domain because the CPE/ICI does not fluctuate much between subcarriers. For example, it is assumed that the PT-RSs are mapped at a density of every Resource Block (RB) (e.g., one subcarrier), one in adjacent 2 RBs, one in adjacent 4 RBs, or the like. This is called "PT-RS frequency domain density."

According to the agreements on the PT-RSs in 3GPP RAN1 #88, the PT-RSs are used between the base station and the mobile station which has received an indication from the base station by higher layer signaling (e.g., Radio Resource Control (RRC) signaling). Further, it is assumed that the PT-RS time domain density or frequency domain density flexibly varies depending on the MCS, bandwidth, or the like used between the base station and the mobile station.

In contrast, the DMRSs used for channel estimation are mapped more densely in the frequency domain and less densely in the time domain than the PT-RSs because the change in the channel characteristics in the frequency domain is large but the change in the time domain is not as large as the phase noise. Further, in New RAT, introduction of a front-loaded DMRS mapped in the front of a slot is assumed in order to advance the timing of data demodulation.

It is also contemplated that the PT-RSs are mapped to the same antenna port as a certain DMRS (this port may be referred to as a PT-RS port), and that the same precoding as the DMRS port is applied to the PT-RSs. Therefore, the receiver may use the PT-RSs for channel estimation like the DMRS.

It is also contemplated that the PT-RSs are defined as part of the DMRSs. In this case, DMRSs used for CPE/ICI estimation are mapped more densely in the time domain and less densely in the frequency domain than the other DMRSs. A reference signal used to correct CPE/ICI caused by the phase noise may also be referred to by a different name than "PT-RS."

[Determination Method for Determining PT-RS Mapping Density]

A method for the mobile station to determine the PT-RS mapping density has been studied. There is one method in which the PT-RS mapping density is indicated from the base station by a PT-RS dedicated control signal (e.g., DCI, higher layer signal, or the like) (explicit indication). There is another method in which the correspondence between the PT-RS mapping density and another parameter (e.g., MCS, bandwidth, or the like) is determined in advance, and the mobile station compares the correspondence with the other parameter indicated by DCI at the time of communication to determine the PT-RS mapping density (implicit indication). Note that there is a possibility that methods other than these methods may be used, but the use of implicit indication is currently assumed.

As described above, it is assumed that the PT-RSs are mapped in accordance with the time domain density of every symbol, one symbol in two adjacent symbols, one symbol in four adjacent symbols, or the like. For example, the information indicating the PT-RS time domain density is implicitly indicated from the base station to the mobile station by the MCS index included in the DCI. For example, the base station and the mobile station are assumed to decide/determine that the greater the value of the indicated MCS index, the higher the PT-RS time domain density. This is because it has been understood that, generally, the effect of phase noise is greater and the CPE/ICI estimation using densely mapped PT-RSs is required more as the MCS for use is of the higher order.

FIG. 4 illustrates an exemplary relationship between the MCS index (e.g., denoted by "$I_{MCS}$") and the PT-RS time domain density (e.g., denoted by "$L_{PT-RS}$"). In FIG. 4, "ptrs-MCSi" (any value of i=1, 2, 3, and 4) denotes a value called an MCS threshold and indicates an MCS index serving as a border at which PT-RS time domain density $L_{PT-RS}$ is changed.

In FIG. 4, except for the case of "PT-RS is not present" (the case where $I_{MCS}$ is less than ptrs-MCS1), the PT-RSs are mapped at a time domain density of one symbol in $L_{PT-RS}$ adjacent symbols. FIG. 5 illustrates an exemplary relationship between the value of $L_{PT-RS}$ and the PT-RS mapping in a Cyclic Prefix-Orthogonal Frequency Division Multiplexing (CP-OFDM) waveform. Note that, the value of $L_{PT-RS}$ is not limited to 1, 2, and 4, and may be another value.

For example, the other MCS thresholds (ptrs-MCS1, ptrs-MCS2 and ptrs-MCS3) except for ptrs-MCS4 in FIG. 4 are values to be configured for each mobile station by the base station using the higher layer signal in accordance with the capabilities of the mobile stations. By flexible configuration of these MCS thresholds for each of the mobile stations, it is assumed that the magnitude or characteristics of the phase noise varying depending on the characteristics of the hardware or implementation of the phase oscillator or the like of the mobile station is dealt with.

It is assumed that the MCS thresholds are configured with reference to the MCS index table (e.g., MCS index table 1, 2 or 3) configured for the mobile station by the higher layer signal. For example, a result of determination by the base station on a necessary PT-RS mapping density with respect to the MCS (e.g., modulation order or spectral efficiency) included in the MCS index table configured for the mobile station is reflected in the MCS thresholds to be configured for the mobile station.

However, as described above, it is assumed that the mobile station refers to MCS index table 3 regardless of the indication of the higher layer in the case of modulation or demodulation of URLLC data. Therefore, for example, when MCS index table 1 or MCS index table 2 is configured for the mobile station by the higher layer signal, the base station and the mobile station at the time of the modulation or demodulation of URLLC data apply, to MCS index table 3 used for the modulation or demodulation of URLLC data, MCS thresholds optimized on the assumption of MCS index table 1 or 2 configured by the higher layer signal, so as to determine the PT-RS time domain density.

Thus, a problem may arise in that the mapping of actually transmitted PT-RSs is not suitable with respect to the MCS (e.g., modulation order or spectral efficiency) used for modulation or demodulation of URLLC data.

An example of the above problem is illustrated in FIG. 6. In FIG. 6, the mobile station is configured with MCS index table 2 and MCS threshold ptrs-MCS1=11 by the higher layer signal. Note that, while a description with reference to FIG. 6 will be given of ptrs-MCS1 as an example, but the same applies to other MCS thresholds ptrs-MCS2 and ptrs-MCS3.

For example, in FIG. 6, in a case where the relationship illustrated in FIG. 4 is referred to, it is considered that the intention of the higher layer configuring MCS threshold ptrs-MCS1=11 is that PT-RSs are not mapped (or transmitted) (corresponding to "PT-RS is not present") in the case of MCSes corresponding to "$Q_m<6$" or "SE<2.7305" corresponding to MCS indexes <ptrs-MCS1=11 in MCS index table 2 while PT-RSs are mapped (or transmitted) in the case of other MCSes (e.g., MCS index≥ptrs-MCS1=11) (corresponding to $L_{PT-RS}$=1, 2 or 4, for example).

However, as illustrated in FIG. 6, when MCS threshold ptrs-MCS1=11 configured based on MCS index table 2 is applied to MCS index table 3, MCS index<ptrs-MCS1=11 corresponds to "part of $Q_m\leq 2$" or "SE<0.7402." Therefore, if MCS threshold ptrs-MCS1=11 configured based on MCS index table 2 is applied to MCS index table 3, it is interpreted, contrary to the intention of the higher layer, that PT-RSs are transmitted even in the case of the part of the MCSes which corresponds to "$Q_m<6$" or "SE<2.7305." Consequently, PT-RSs are transmitted even in the range of MCS where PT-RSs are determined by the higher layer not to be transmitted, thus resulting in waste of resources.

As is understood, when the MCS index table configured by the higher layer signal is different from the MCS index table to be referred to at the time of modulation or demodulation of data, the mapping of actually transmitted PT-RSs may not be suitable for the MCS used at the time of modulation or demodulation.

To solve this, for example, NPL 4 proposes a method in which, in addition to MCS thresholds suitable for an MCS index table configured by the higher layer signal (for example, MCS thresholds suitable for MCS index table 2 in FIG. 6), the base station determines additional MCS thresholds suitable for an MCS index table referred to at the time of modulation or demodulation of data (for example, the MCS thresholds suitable for MCS index table 3 in FIG. 6), and the mobile station is configured with both the MCS thresholds by the higher layer signal. However, in the method described in NPL 4, a problem of an increase in the overhead of the higher layer signal arises.

An exemplary embodiment of the present disclosure will be described in relation to a method for suitable PT-RS mapping without increasing signaling overhead.

[Signal Waveform]

In New RAT, it is assumed that the CP-OFDM scheme is used in the downlink (DL) (the direction from the base station to the mobile station). Meanwhile, the use of both the CP-OFDM scheme and a Discrete Fourier Transform-Spread OFDM (DFT-S-OFDM) scheme in the uplink (UL) (the direction from the mobile station to the base station) has been studied, and it is assumed that both the communication schemes are used while switching them in accordance with the communication environment.

Embodiment 1

The present embodiment will be described in relation to a case where a transmitter (base station) transmits PT-RSs to a receiver (mobile station) in the downlink.

[Outline of Communication System]

A communication system according to the present embodiment includes base station (transmitter) 100 and mobile station (receiver) 200.

Figure 7:
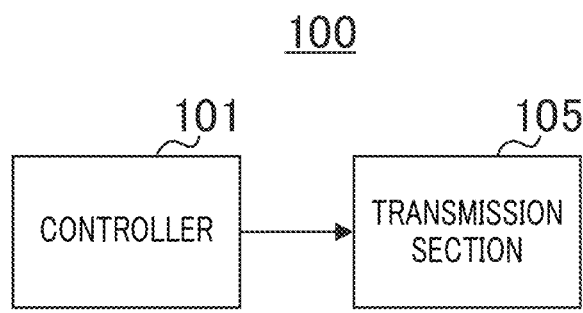
FIG. 7 is a block diagram illustrating an example of the configuration of part of a base station according to Embodiment 1.

FIG. 7 is a block diagram illustrating an example of the configuration of part of base station 100 according to the present embodiment. In base station 100 illustrated in FIG. 7, controller 101 determines second thresholds (for example, MCS thresholds used for modulation or demodulation of data) based on first thresholds (for example, MCS thresholds configured by the higher layer signal) used for determination of the mapping of a reference signal (for example, a PT-RS) (for example, for determination of the mapping density). Transmission section 105 transmits the reference signal mapped based on the second thresholds.

Figure 8:
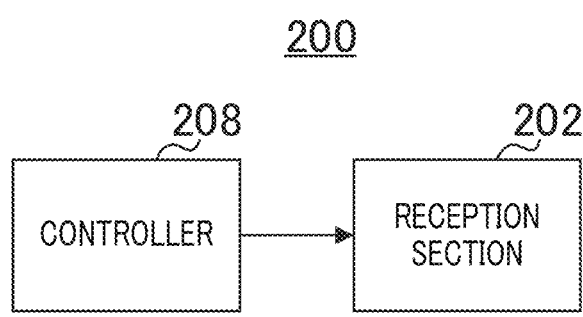
FIG. 8 is a block diagram illustrating an example of the configuration of part of a mobile station according to Embodiment 1.

FIG. 8 is a block diagram illustrating an example of the configuration of part of mobile station 200 according to the present embodiment. In mobile station 200 illustrated in FIG. 8, controller 208 determines second thresholds (for example, MCS thresholds used for modulation or demodulation of data) based on first thresholds (for example, MCS thresholds configured by the higher layer signal) used for determination of the mapping of a reference signal (for example, a PT-RS) (for example, for determination of the mapping density). Reception section 202 receives the reference signal mapped based on the second thresholds.

[Configuration of Base Station]

Figure 9:
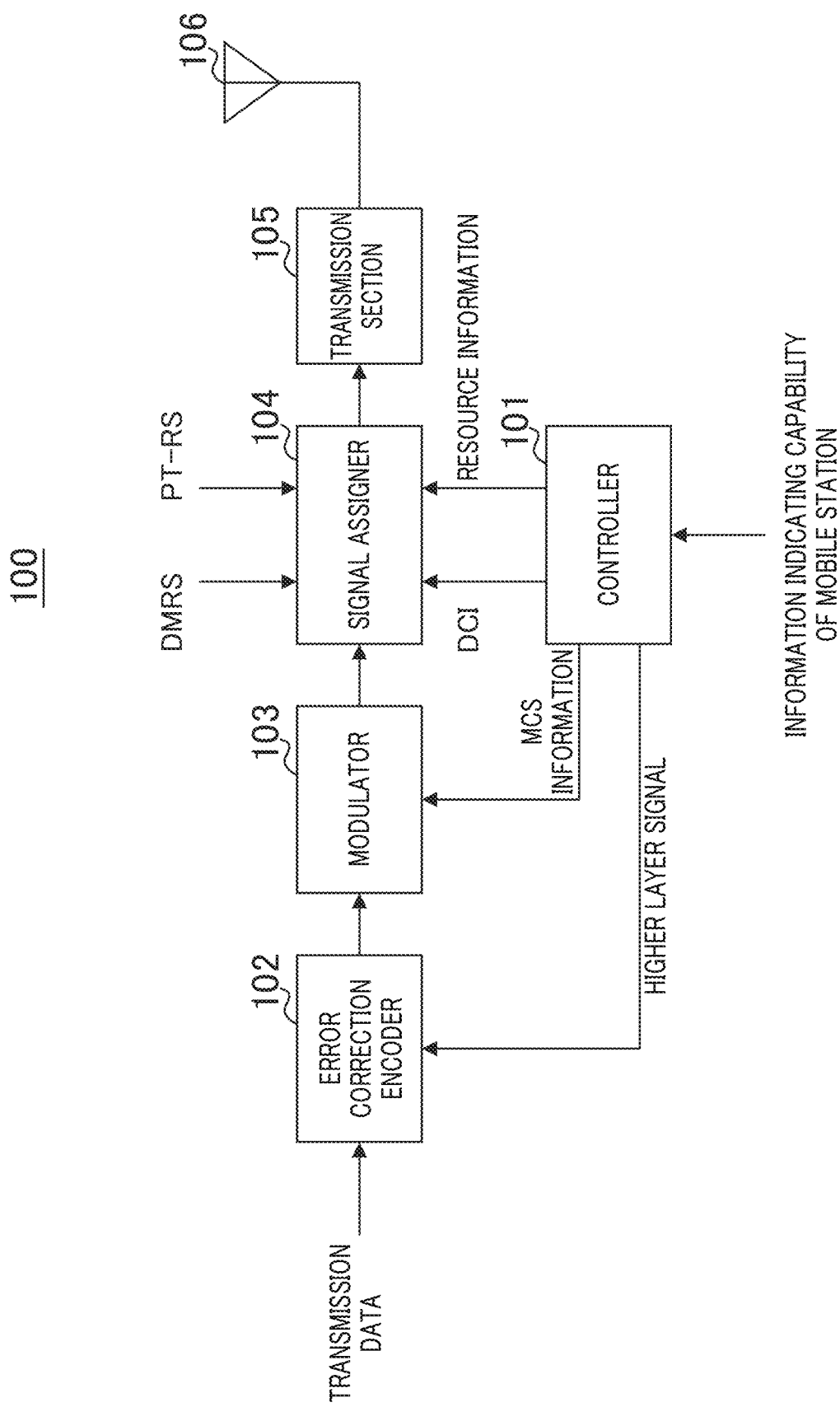
FIG. 9 is a block diagram illustrating an example of the configuration of the base station according to Embodiment 1.

FIG. 9 is a block diagram illustrating an example of the configuration of base station 100 according to the present embodiment. In FIG. 9, base station 100 includes controller 101, error correction encoder 102, modulator 103, signal assigner 104, transmission section 105, and antenna 106.

Information (e.g., UE capability) indicating the capability of the mobile station is inputted to controller 101. Controller 101 determines the MCS index table or MCS thresholds used by mobile station 200 based on, for example, the information indicating the capability of the mobile station. Controller 101 outputs the higher layer signal including information indicating the determined MCS index table or MCS thresholds to error correction encoder 102.

Controller 101 also determines the MCS (e.g., MCS index) or the resources for assignment of signals that is/are to be used in transmission of downlink data (e.g., eMBB data or URLLC data). Controller 101 outputs MCS information indicating the determined MCS to modulator 103, or outputs resource information indicating the determined resources to signal assigner 104. Controller 101 also outputs DCI including the determined MCS or resources to signal assigner 104.

Further, when URLLC data is transmitted in the case where the MCS index table configured for mobile station 200 by the higher layer signal is different from the MCS index table (for example, MCS index table 3) to be used in transmission of URLLC data, controller 101 replaces (in other words, converts or translates), with values corresponding to the MCS index table used in transmission of URLLC data (for example, referred to as "URLLC-data PT-RS MCS thresholds"), the MCS thresholds configured for mobile station 200 by the higher layer signal. Then, controller 101 determines resources for assignment of PT-RSs by using the PT-RS mapping density derived based on the replacing MCS thresholds, and outputs resource information indicating the determined allocation resources to signal assigner 104. Note that, a configuration method for configuring the URLLC-data PT-RS MCS thresholds will be described in detail below.

Note that, when transmitting data (e.g., eMBB data) other than URLLC data, controller 101 determines resources for assignment of PT-RSs by using the PT-RS mapping density derived based on the MCS thresholds configured for mobile station 200 by the higher layer signal, and outputs resource information indicating the determined allocation resources to signal assigner 104.

Error correction encoder 102 performs error correction coding on an inputted transmission data signal (in other words, downlink data) or the higher layer signal inputted from controller 101, and outputs the signal after the error correction coding to modulator 103.

Modulator 103 performs modulation processing on the signal inputted from error correction encoder 102 based on the MCS information inputted from controller 101, and outputs the modulated signal to signal assigner 104.

Signal assigner 104 maps, for example, the signal inputted from modulator 103 (the transmission data signal or the higher layer signal), the DCI inputted from controller 101, or a reference signal (e.g., DMRS or PT-RS) in the time-frequency domain, and outputs the mapped signal to transmission section 105. At this time, signal assigner 104 maps (assigns) signals to the resources based on the resource information inputted from controller 101.

Transmission section 105 performs radio transmission processing such as frequency conversion using a carrier wave on the signal inputted from signal assigner 104, and outputs the signal after the radio transmission processing to antenna 106.

Antenna 106 radiates the signal inputted from transmission section 105 toward mobile station 200.

[Configuration of Mobile Station]

Figure 10:
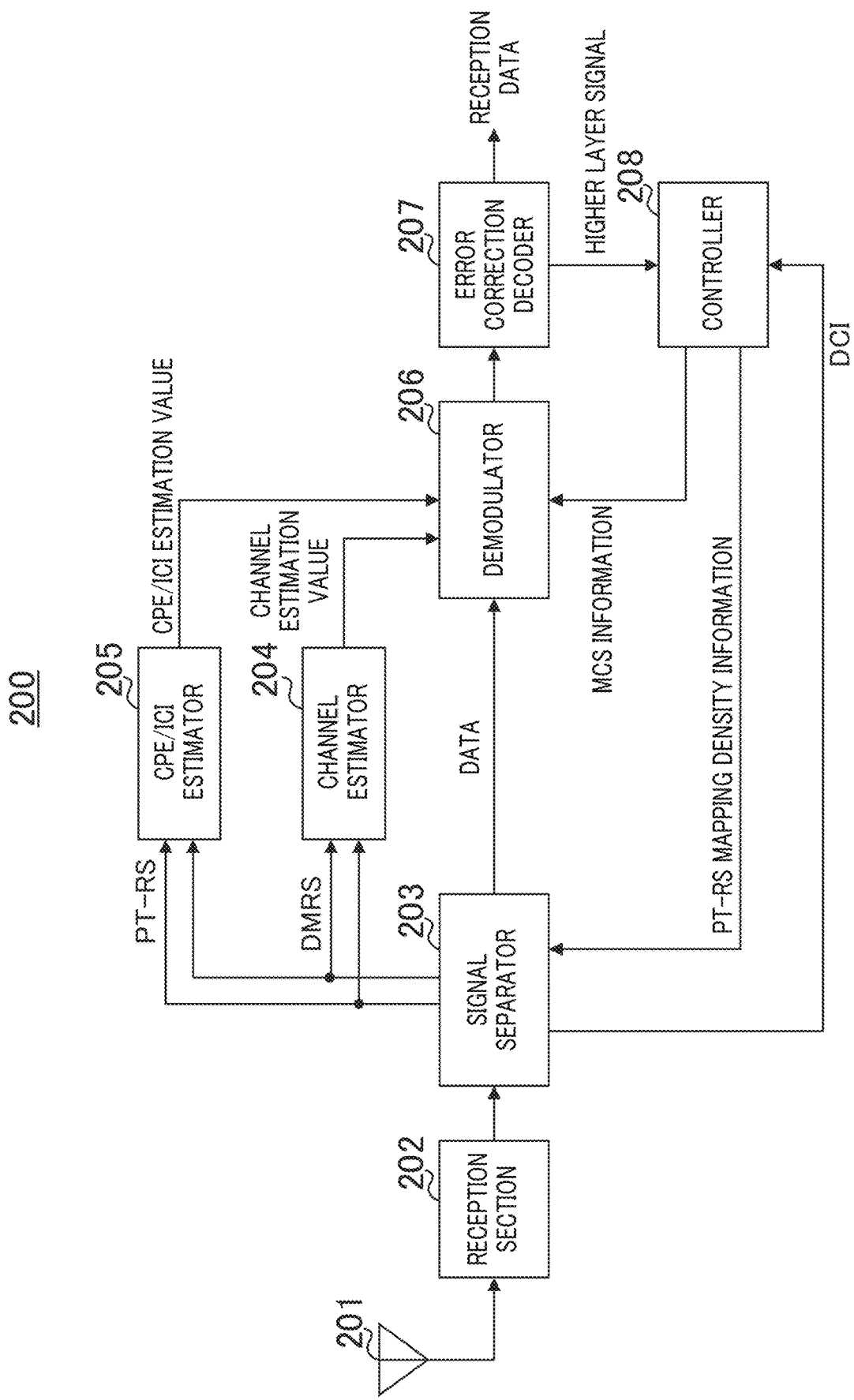
FIG. 10 is a block diagram illustrating an example of the configuration of the mobile station according to Embodiment 1.

FIG. 10 is a block diagram illustrating an example of the configuration of mobile station 200 according to the present embodiment. In FIG. 10, mobile station 200 includes antenna 201, reception section 202, signal separator 203, channel estimator 204, CPE/ICI estimator 205, demodulator 206, error correction decoder 207, and controller 208.

Antenna 201 receives the signal transmitted from base station 100 (see FIG. 9) and outputs the received signal to reception section 202.

Reception section 202 performs radio reception processing, such as frequency conversion, on the received signal inputted from antenna 201, and outputs the signal after the radio reception processing to signal separator 203.

Signal separator 203 identifies the position in the time-frequency domain in which the data signal, DMRS, or PT-RS in the signal inputted from reception section 202 is mapped, and separates the data signal, DMRS, or PT-RS. At this time, signal separator 203 separates the PT-RS based on PT-RS mapping density information inputted from controller 208, which will be described below. Signal separator 203 outputs, of separated signals, the data signal to demodulator 206, the DMRS to channel estimator 204 and CPE/ICI estimator 205, and the PT-RS to channel estimator 204 and CPE/ICI estimator 205.

Channel estimator 204 estimates a channel using the DMRS inputted from signal separator 203, and outputs a channel estimation value (channel information) to demodulator 206. Note that, channel estimator 204 may estimate the channel using the PT-RS inputted from signal separator 203.

CPE/ICI estimator 205 estimates CPE/ICI using the PT-RS and DMRS inputted from signal separator 203, and outputs a CPE/ICI estimation value to demodulator 206.

Demodulator 206 demodulates the data signal inputted from signal separator 203 using the MCS information inputted from controller 208, the channel estimation value inputted from channel estimator 204, and the CPE/ICI estimation value inputted from CPE/ICI estimator 205. Demodulator 206 outputs the demodulated signal to error correction decoder 207.

Error correction decoder 207 decodes the demodulated signal inputted from demodulator 206, outputs the obtained reception data signal, and outputs the obtained higher layer signal to controller 208.

Based on information included in the higher layer signal inputted from error correction decoder 207, controller 208 determines the type of MCS index table and the MCS thresholds configured for mobile station 200.

Controller 208 also determines the traffic type (e.g., eMBB or URLLC) of the data and the scheduled MCS (e.g., MCS index) based on the DCI inputted from signal separator 203 or information included in the DCI. Controller 208 outputs MCS information indicating an MCS specified by the determined traffic type and MCS index to demodulator 206.

Further, when the traffic type is, for example, URLLC and the MCS index table configured by the higher layer differs from the MCS index table used in reception of URLLC data (for example, MCS index table 3), controller 208 replaces, with values corresponding to the MCS index table used in reception of the URLLC data (for example, the URLLC-data PT-RS MCS thresholds), the MCS thresholds configured by the higher layer signal. Then, controller 208 derives the PT-RS mapping density based on the replacing MCS thresholds and the MCS index indicated by the DCI, and outputs PT-RS mapping density information indicating the derived mapping density to signal separator 203. Note that, the configuration method for configuring the URLLC-data PT-RS MCS thresholds will be described in detail below.

Note that, when the traffic type is a type other than URLLC (for example, eMBB), controller 208 derives the PT-RS mapping density based on the MCS thresholds configured by the higher layer signal and the MCS index indicated by the DCI, and outputs the PT-RS mapping density information indicating the derived mapping density to signal separator 203.

[Operation of Base Station 100 and Mobile Station 200]

Next, the operation of base station 100 (see FIG. 9) and mobile station 200 (see FIG. 10) will be described in detail.

Figure 11:
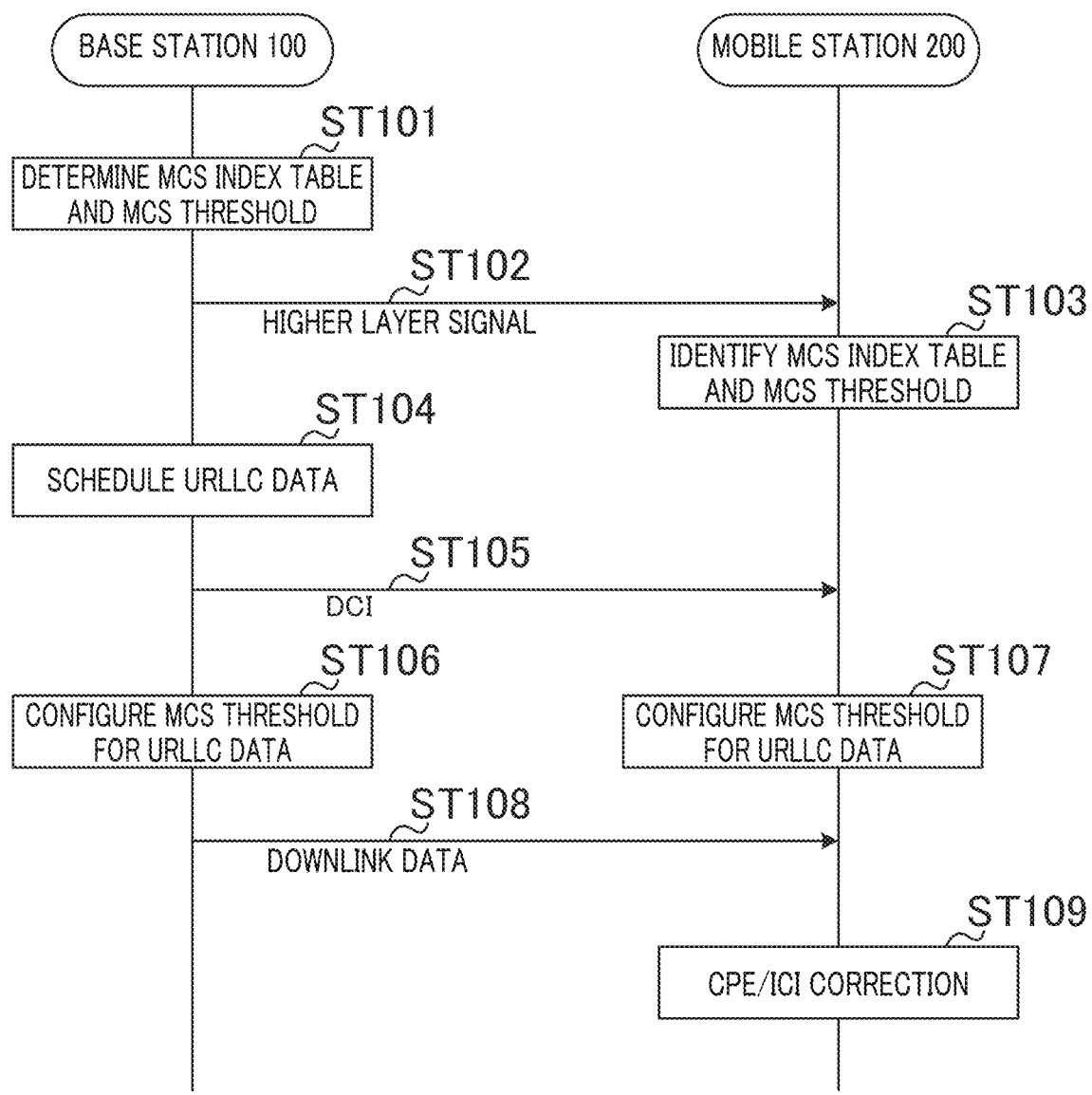
FIG. 11 is a sequence diagram illustrating a configuration example of configuration by the base station and the mobile station according to Embodiment 1.

FIG. 11 is a sequence diagram illustrating exemplary processing of base station 100 and mobile station 200.

For example, base station 100 determines the MCS index table and MCS thresholds ptrs-MCSi (i=1 to 3) for mobile station 200 (ST101). For example, base station 100 configures mobile station 200 with values of the MCS index table (e.g., MCS index table 1, 2, or the like) and MCS thresholds ptrs-MCSi (i=1, 2, and 3) based on information on the capability and the like of mobile station 200.

The determined MCS index table and MCS thresholds ptrs-MCSi are transmitted to (configured for) mobile station 200 by, for example, the higher layer signal (ST102). Mobile station 200 identifies the configured MCS index table and MCS thresholds (e.g., ptrs-MCSi (i=1 to 3)) based on the higher layer signal from base station 100 (ST103).

Base station 100 schedules, for example, URLLC data for mobile station 200 (ST104). For example, base station 100 prepares DCI scrambled by a specific Radio Network Temporary Indicator or Radio Network Temporary Identifier (RNTI) such as an MCS-C-RNTI, URLLC data indicated by the DCI, and PT-RSs for use in CPE/ICI estimation of the URLLC data (e.g., URLLC-data PT-RSs).

Base station 100 indicates the DCI including scheduling information for the URLLC data to mobile station 200 (ST105). For example, mobile station 200 receives the DCI indicated from base station 100 and determines that the traffic type of the data corresponding to the DCI is URLLC when the DCI satisfies a condition such as that the DCI is scrambled by the specific RNTI such as the MCS-C-RNTI. In this case, mobile station 200 uses the MCS index table for URLLC data (e.g., MCS index table 3) when demodulating the URLLC data.

Base station 100 and mobile station 200 configure the URLLC-data PT-RS MCS thresholds (e.g., expressed as "ptrs-MCSi_U" (i=1 to 3)) based on the MCS thresholds (ptrs-MCSi (i=1 to 3)) configured for mobile station 200 by the higher layer signal (ST106 and ST107). For example, base station 100 and mobile station 200 replace, with values for URLLC (e.g., MCS index table 3), the values of ptrs-MCSi (i=1, 2, 3) configured for mobile station 200. Note that, the configuration method for configuring the URLLC-data PT-RS MCS thresholds will be described in detail below.

Base station 100 transmits downlink data (e.g., including the URLLC data and PT-RSs) to mobile station 200 (ST108). Note that base station 100 modulates the URLLC data using the MCS listed in MCS index table 3. Further, base station 100 determines the PT-RS mapping density based on URLLC-data PT-RS MCS thresholds ptrs-MCSi_U configured at ST106.

Mobile station 200 performs CPE/ICI correction using the PT-RSs on the downlink data transmitted from base station 100, and demodulates the downlink data (ST109). Note that, mobile station 200 identifies the PT-RS mapping density in the downlink data based on URLLC-data PT-RS MCS thresholds ptrs-MCSi_U configured at ST107.

Next, the configuration method for base station 100 and mobile station 200 to configure the URLLC-data PT-RS MCS thresholds (for example, processing of ST106 and ST107 in FIG. 11) will be described in detail.

In the following description, by way of example, MCS index table 2 is configured for mobile station 200 by the higher layer signal. In addition, MCS thresholds (ptrs-MCSi (e.g., i=1 to 3)) suitable for MCS index table 2 are configured for mobile station 200 by the higher layer signal. Base station 100 and mobile station 200 use MCS index table 3 regardless of the configuration by the higher layer signal when transmitting and receiving URLLC data, for example.

In addition, the following description will be given of a case where base station 100 transmits, to mobile station 200 configured with the use of MCS index table 2 by the higher layer signal, data of which the traffic type is URLLC, and, the PT-RS using a high-frequency band and a high modulation order, for example.

In this case, base station 100 and mobile station 200 determine, as the URLLC-data PT-RS MCS thresholds (ptrs-MCSi_U), MCS indexes in MCS index table 3 used for modulation or demodulation of the URLLC data based on MCS values (e.g., modulation orders or spectral efficiencies)

corresponding to MCS indexes corresponding to MCS thresholds configured by the higher layer signal.

For example, base station 100 and mobile station 200 select, from MCS index table 3 used for modulation or demodulation of URLLC data, MCS indexes corresponding to MCSes having values similar to the MCS values (e.g., the modulation orders or the spectral efficiencies) corresponding to the MCS indexes corresponding to the MCS thresholds configured by the higher layer signal, and configure the selected MCS indexes as URLLC-data PT-RS MCS thresholds.

Base station 100 and mobile station 200 use the URLLC-data PT-RS MCS thresholds for deriving the URLLC-data PT-RS mapping density.

Hereinafter, configuration example 1 and configuration example 2 for configuring the URLLC-data PT-RS MCS thresholds will be described.

Configuration Example 1

In configuration example 1, in the downlink of the CP-OFDM signal waveform, base station 100 and mobile station 200 configure MCS indexes in MCS index table 3 as the URLLC-data PT-RS MCS thresholds based on "spectral efficiencies (SEs)" corresponding to MCS indexes in MCS index table 2 corresponding to MCS thresholds configured by the higher layer signal.

For example, base station 100 configures, as URLLC MCS thresholds, the MCS indexes in MCS index table 3 corresponding to the spectral efficiencies (SE) similar (e.g., equal or close) to the spectral efficiencies (SE) corresponding to the MCS indexes in MCS index table 2 corresponding to ptrs-MCSi configured for mobile station 200.

Figure 12:
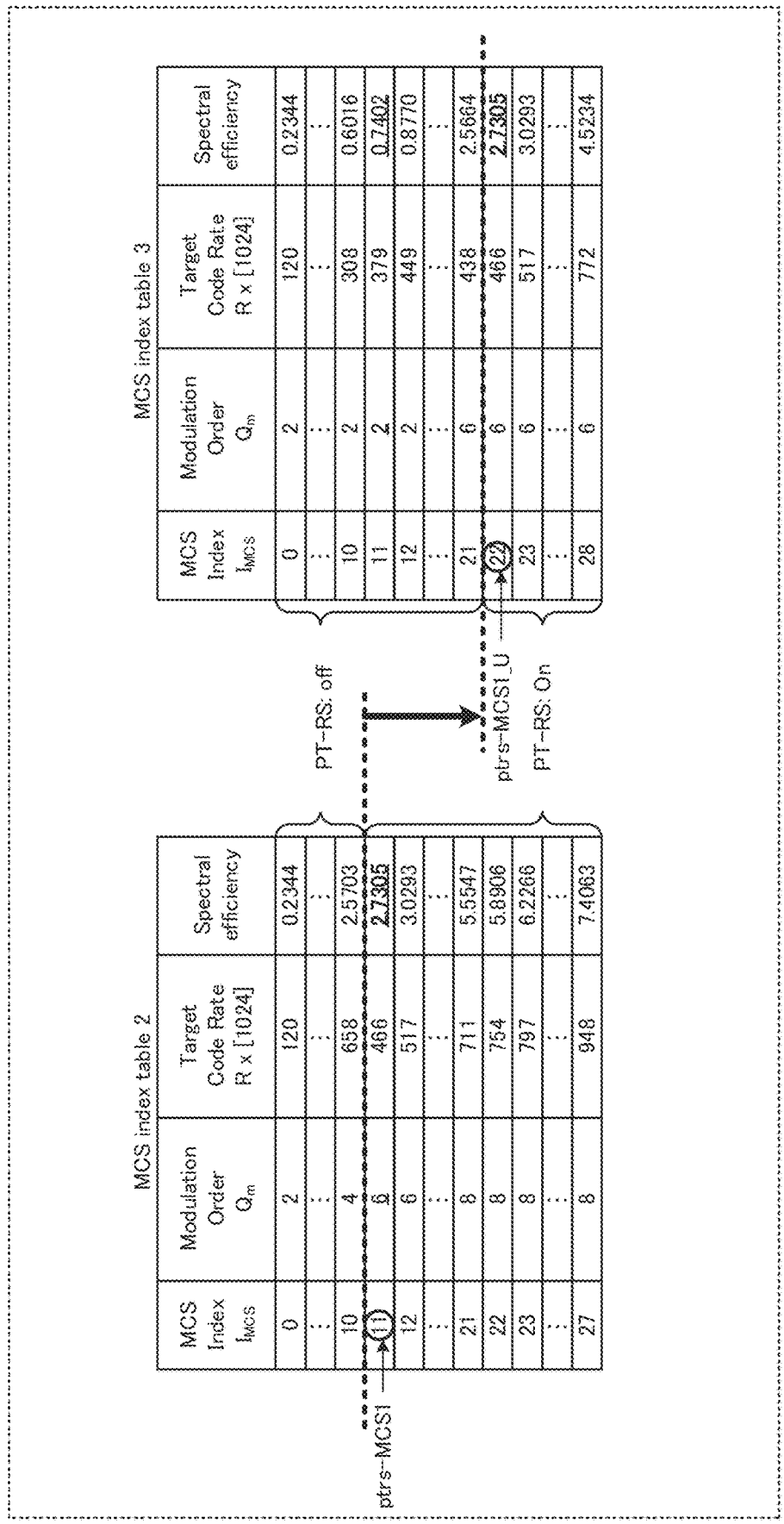
FIG. 12 illustrates a configuration example for configuring the MCS thresholds for PT-RS according to Embodiment 1.

FIG. 12 illustrates a configuration example for the URLLC MCS thresholds in configuration example 1.

In FIG. 12 as in FIG. 6, MCS index table 2 and MCS threshold ptrs-MCS1=11 are configured for mobile station 200 by the higher layer signal.

In the case of FIG. 12, with reference to MCS index table 2 (e.g., FIG. 2) configured by the higher layer, base station 100 confirms the value=2.7305 of spectral efficiency (SE) corresponding to MCS index ($I_{MCS}$)=11 corresponding to MCS threshold ptrs-MCS1.

Next, with reference to MCS index table 3 (e.g., FIG. 3) used for modulation of URLLC data, base station 100 configures, as URLLC MCS threshold ptrs-MCS1_U, MCS index ($I_{MCS}$)=22 corresponding to spectral efficiency (SE)= 2.7305 equal to the spectral efficiency (SE) corresponding to MCS index ($I_{MCS}$)=11 in MCS table 2. Base station 100 stores ptrs-MCS1_U=22.

Base station 100 also replaces ptrs-MCS2 and ptrs-MCS3 with URLLC MCS thresholds ptrs-MCS2_U and ptrs-MCS3_U, and stores ptrs-MCS2_U and ptrs-MCS3_U.

Note that, ptrs-MCS4 is configured in advance as the smallest MCS index among the reserved MCS indexes in each of the MCS index tables, for example. For example, ptrs-MCS4=29 in MCS index table 1 (FIG. 1) and MCS index table 3 (FIG. 3), and ptrs-MCS4=28 in MCS index table 2 (FIG. 2).

FIG. 13 illustrates an exemplary relationship between the MCS index ($I_{MCS}$) and the PT-RS time domain density ($L_{PT-RS}$) at the time of transmission/reception of URLLC data. Base station 100 derives the URLLC PT-RS time domain density based on FIG. 13, for example.

Base station 100 maps, to the resources, the PT-RSs prepared based on the above procedure, and transmits the PT-RSs to mobile station 200.

Meanwhile, when mobile station 200 determines that the traffic type of the data corresponding to the DCI indicated from base station 100 is URLLC, the mobile station replaces, with the values of the URLLC-data PT-RS MCS thresholds (e.g., ptrs-MCSi_U (i=1, 2 and 3)), the values of the MCS thresholds (e.g., ptrs-MCSi (i=1, 2 and 3)) configured by the higher layer signal from base station 100 in the same manner as base station 100.

For example, mobile station 200 configures, as URLLC MCS thresholds, the MCS indexes in MCS index table 3 corresponding to the spectral efficiencies (SE) similar (e.g., equal or close) to the spectral efficiencies (SE) corresponding to the MCS indexes corresponding to ptrs-MCSi configured for mobile station 200 (see e.g., FIG. 12).

With this configuration, mobile station 200 identifies the relationship (see e.g., FIG. 13) between the MCS index ($I_{MCS}$) and the PT-RS time domain density ($L_{PT-RS}$) at the time of transmission/reception of URLLC data. Mobile station 200 derives the URLLC PT-RS time domain density based on the relationship (for example, FIG. 13) between the MCS index ($I_{MCS}$) indicated in the DCI indicated from base station 100 and the PT-RS time domain density ($L_{PT-RS}$).

Then, mobile station 200 receives the PT-RSs mapped to the resources according to the derived time domain density, and demodulates (e.g., performs CPE/ICI correction on) the URLLC data using the received PT-RSs.

Here, for example, in FIG. 12, in a case where the relationship illustrated in FIG. 4 is referred to, the intention of the higher layer configuring MCS threshold ptrs-MCS1=11 is that PT-RSs are not mapped (corresponding to "PT-RS is not present") in the case of MCSes corresponding to "SE<2.7305" corresponding to MCS indexes <ptrs-MCS1=11 in MCS index table 2 while PT-RSs are mapped in the case of other MCSes (e.g., MCS index≥ptrs-MCS1=11) (corresponding to $L_{PT-RS}$=1, 2 or 4, for example).

Further, for example, in FIG. 12, in a case where the relationship illustrated in FIG. 13 is referred to, since MCS threshold ptrs-MCS1_U=22 is configured in MCS table 3, PT-RSs are not mapped (corresponding to "PT-RS is not present") in the case of MCSes corresponding to "SE<2.7305" while PT-RSs are mapped in the case of other MCSes (e.g., MCS index≥ptrs-MCS1_U=22) (corresponding to $L_{PT-RS}$=1, 2 or 4, for example) as with MCS index table 2.

As illustrated in FIG. 12, MCS thresholds ptrs-MCSi configured by the higher layer signal are replaced with URLLC-data PT-RS MCS thresholds ptrs-MCSi_U, and therefore, transmission and reception of PT-RSs reflecting the intention of the higher layer configuring MCS threshold ptrs-MCS1=11 become possible even at the time of transmission and reception of URLLC data.

As is understood, according to configuration example 1, even when the MCS index table configured by the higher layer signal differs from the MCS index table referred to for modulation or demodulation of data, the PT-RS mapping suitable for the MCS used for modulation or demodulation of data is configured.

In addition, mobile station 200 configures the URLLC-data PT-RS MCS thresholds based on the MCS thresholds configured by the higher layer signal and spectral efficiencies in a plurality of MCS index tables held by mobile station 200. Thus, in configuration example 1, a new higher layer signal for configuration of the URLLC-data PT-RS MCS thresholds is not necessary.

Therefore, according to configuration example 1, it is possible to suitably map URLLC PT-RSs in downlink without causing an increase in the overhead of the higher layer signal. Further, configuration example 1 can achieve similar URLLC PT-RS mapping densities and similar CPE/ICI estimation accuracies with respect to similar spectral efficiencies between eMBB and URLLC, for example.

Configuration Example 2

In configuration example 2, in the downlink of the CP-OFDM signal waveform, base station 100 and mobile station 200 configure MCS indexes in MCS index table 3 as the URLLC-data PT-RS MCS thresholds based on "modulation orders ($Q_m$)" corresponding to MCS indexes in MCS index table 2 corresponding to MCS thresholds configured by the higher layer signal.

Note that, in configuration example 2, the configuration method for the URLLC MCS thresholds differs from the configuration method in configuration example 1, which will be described below. Meanwhile, operations other than the configuration method for base station 100 and mobile station 200 to configure the URLLC MCS thresholds are the same between configuration examples 1 and 2, and such operations will thus not be described.

For example, base station 100 and mobile station 200 configure, as URLLC MCS thresholds, MCS indexes in MCS index table 3 corresponding to modulation orders ($Q_m$) similar to modulation orders corresponding to MCS indexes in MCS index table 2 corresponding to ptrs-MCSi configured for mobile station 200.

Here, by way of example, a description will be given in relation to a case where MCS index table 2 and MCS threshold ptrs-MCS1=11 are configured by the higher layer signal.

In this case, with reference to MCS index table 2 (e.g., FIG. 2) configured by the higher layer signal, base station 100 and mobile station 200 confirm the value=6 of the modulation order ($Q_m$) corresponding to MCS index ($I_{MCS}$)=11 corresponding to MCS threshold ptrs-MCS1.

Next, with reference to MCS index table 3 (e.g., FIG. 3) used for modulation of URLLC data, base station 100 and mobile station 200 configure, as URLLC MCS threshold ptrs-MCS1_U, an MCS index corresponding to modulation order ($Q_m$)=6 equal to the modulation order ($Q_m$) corresponding to MCS index ($I_{MCS}$)=11 in MCS table 2. Base station 100 and mobile station 200 store ptrs-MCS1_U.

For example, MCS index table 3 illustrated in FIG. 3 includes eight MCS indexes of $I_{MCS}$=21 to 28 corresponding to modulation order ($Q_m$)=6 equal to the modulation order ($Q_m$) corresponding to MCS index ($I_{MCS}$)=11 in MCS table 2. Base station 100 and mobile station 200 may configure, as URLLC MCS threshold ptrs-MCS1_U, any of the MCS indexes corresponding to the modulation order ($Q_m$)=6 in MCS index table 3.

For example, base station 100 and mobile station 200 may configure, as URLLC MCS threshold ptrs-MCS1_U, the smallest MCS index=21 among the MCS indexes corresponding to the modulation order ($Q_m$)=6 in MCS index table 3. Thus, PT-RSs are more likely to be mapped, and the PT-RS mapping density is not unnecessarily lowered, so that the accuracy of CPE/ICI estimation in mobile station 200 can be improved.

Alternatively, for example, base station 100 and mobile station 200 may configure, as URLLC MCS threshold ptrs-MCS1_U, the greatest MCS index=28 among the MCS indexes corresponding to the modulation order ($Q_m$)=6 in MCS index table 3. Thus, PT-RSs are less likely to be mapped, and the PT-RS mapping density is not unnecessarily increased, so that the overhead caused by PT-RSs can be reduced.

Alternatively, for example, base station 100 and mobile station 200 may configure, as URLLC MCS threshold ptrs-MCS1_U, an MCS index (e.g., MCS index=22) whose another value (spectral efficiency or coding rate) is similar to the value of MCS index=11 in MCS index table 2 among the MCS indexes in MCS index table 3 corresponding to modulation order ($Q_m$)=6. Note that the reserved MCS indexes where, for example, neither the coding rate nor the spectral efficiency are specified are not configured as the URLLC-data PT-RS MCS thresholds.

Base station 100 and mobile station 200 also replace ptrs-MCS2 and ptrs-MCS3 with URLLC MCS thresholds ptrs-MCS2_U and ptrs-MCS3_U, and store ptrs-MCS2_U and ptrs-MCS3_U.

Here, for example, the intention of the higher layer configuring MCS threshold ptrs-MCS1=11 is that PT-RSs are not mapped (corresponding to "PT-RS is not present") in the case of MCSes corresponding to "$Q_m<6$" corresponding to MCS index <ptrs-MCS1=11 in MCS index table 2 while PT-RSs are mapped in the case of other MCSes (e.g., MCS index≥ptrs-MCS1=11) (corresponding to $L_{PT-RS}$=1, 2 or 4, for example).

Further, since MCS threshold ptrs-MCS1_U corresponding to $Q_m$=6 is configured in MCS table 3 in configuration example 2, PT-RSs are not mapped (corresponding to "PT-RS is not present") in the case of MCSes corresponding to "$Q_m<6$" while PT-RSs are mapped in the case of other MCSes (e.g., MCS index≥ptrs-MCS1_U) (corresponding to $L_{PT-RS}$=1, 2 or 4, for example) as with MCS index table 2.

MCS thresholds ptrs-MCSi configured by the higher layer signal are replaced with URLLC-data PT-RS MCS thresholds ptrs-MCSi_U, and therefore, transmission and reception of PT-RSs reflecting the intention of the higher layer configuring MCS threshold ptrs-MCS1=11 become possible even at the time of transmission and reception of URLLC data.

As is understood, according to configuration example 2, even when the MCS index table configured by the higher layer signal differs from the MCS index table referred to for modulation or demodulation of data, the PT-RS mapping suitable for the MCS used for modulation or demodulation of data is configured.

In addition, mobile station 200 configures the URLLC-data PT-RS MCS thresholds based on the MCS thresholds configured by the higher layer signal and modulation orders in a plurality of MCS index tables held by mobile station 200. Thus, in configuration example 2, a new higher layer signal for configuration of the URLLC-data PT-RS MCS thresholds is not necessary.

Therefore, according to configuration example 2, it is possible to suitably map URLLC PT-RSs without causing an increase in the overhead of the higher layer signal. Further, configuration example 2 can achieve similar URLLC PT-RS mapping densities and similar CPE/ICI estimation accuracies with respect to similar modulation orders between eMBB and URLLC, for example.

Configuration example 1 and configuration example 2 have been described above.

As described above, in the present embodiment, base station 100 determines the URLLC-data PT-RS MCS thresholds based on the MCS thresholds configured for mobile station 200 by the higher layer signal, and transmits PT-RSs mapped based on the URLLC-data PT-RS MCS thresholds. In addition, mobile station 200 determines the URLLC-data PT-RS MCS thresholds based on the MCS thresholds configured for mobile station 200 by the higher layer signal, and receives the PT-RSs mapped based on the URLLC-data PT-RS MCS thresholds.

Thus, according to the present embodiment, it is possible to suitably map URLLC PT-RSs in the downlink without causing an increase in the overhead of the higher layer signal. Further, according to the present embodiment, when URLLC data is transmitted or received, it is possible to achieve similar PT-RS mapping density and similar CPE/ICI estimation accuracy with respect to an MCS similar to the MCS configured by the higher layer signal (e.g., the MCS for eMBB).

Note that, in configuration example 1 or configuration example 2, MCSes having the same contents as contents (e.g., the modulation orders or the spectral efficiencies) of the MCSes corresponding to the MCS thresholds in the MCS index table configured by the higher layer signal may not exist in the MCS index table used for modulation or demodulation of URLLC data. In this case, base station 100 and mobile station 200 may configure, as the URLLC-data PT-RS MCS thresholds, MCS indexes corresponding to greater values (or smaller values) approximating the contents of the MCSes corresponding to the MCS thresholds in the MCS index table configured by the higher layer signal.

For example, in configuration example 1, when spectral efficiency equal to the spectral efficiency (SE) corresponding to ptrs-MCSi in MCS index table 2 does not exist in MCS index table 3, the greatest value (or smallest value) among the MCS indexes in MCS index table 3 corresponding to "highest SE of those which are equal to or lower than SE corresponding to ptrs-MCSi in MCS index table 2" or the smallest value (or greatest value) among the MCS indexes in MCS index table 3 corresponding to "lowest SE of those which are equal to or higher than SE corresponding to ptrs-MCSi in MCS index table 2" among spectral efficiencies (SEs) corresponding to the MCS indexes included in MCS index table 3 may be configured as the URLLC MCS threshold.

Similarly, in configuration example 2, when modulation order $Q_m$ equal to modulation order $Q_m$ corresponding to ptrs-MCSi in MCS index table 2 does not exist in MCS index table 3, the greatest value (or smallest value) among the MCS indexes in MCS index table 3 corresponding to "highest $Q_m$ of those which are equal to or lower than $Q_m$ corresponding to ptrs-MCSi in MCS index table 2" or the smallest value (or greatest value) among the MCS indexes in MCS index table 3 corresponding to "lowest $Q_m$ of those which are equal to or higher than $Q_m$ corresponding to ptrs-MCSi in MCS index table 2" among modulation orders $Q_m$ corresponding to the MCS indexes listed in MCS index table 3 may be configured as the URLLC MCS threshold, for example.

In any of the above cases, the PT-RS mapping density does not become unnecessarily low, and it is thus possible to prevent a decrease in the CPE/ICI estimation accuracy when a smaller MCS index is selected. On the other hand, when a larger MCS index is selected, the PT-RS mapping density does not become unnecessarily high, and it is thus possible to prevent an unnecessary increase in the PT-RS overhead.

Embodiment 2

The present embodiment will be described in relation to a case where a transmitter (mobile station) transmits PT-RSs to a receiver (base station) in the uplink.

[Outline of Communication System]

A communication system according to the present embodiment includes mobile station 300 (transmitter) and base station 400 (receiver).

Figure 14:
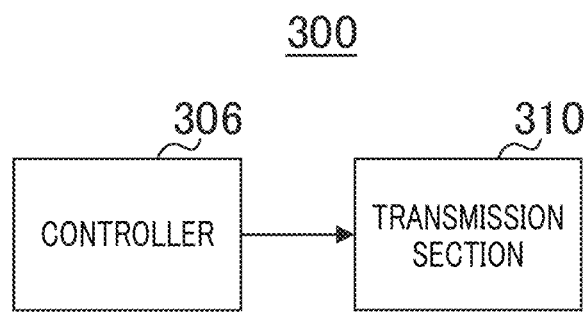
FIG. 14 is a block diagram illustrating an example of the configuration of part of a mobile station according to Embodiment 2.

FIG. 14 is a block diagram illustrating an example of the configuration of part of mobile station 300 according to the present embodiment. In mobile station 300 illustrated in FIG. 14, controller 306 determines second thresholds (for example, MCS thresholds used for modulation or demodulation of data) based on first thresholds (for example, MCS thresholds configured by the higher layer signal) used for determination of the mapping of a reference signal (for example, a PT-RS) (for example, for determination of the mapping density). Transmission section 310 transmits the reference signal mapped based on the second thresholds.

Figure 15:
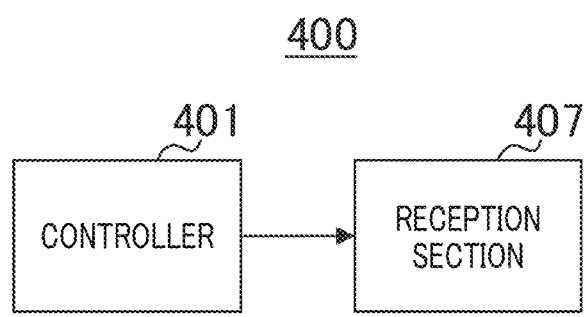
FIG. 15 is a block diagram illustrating an example of the configuration of part of a base station according to Embodiment 2.

FIG. 15 is a block diagram illustrating an example of the configuration of part of base station 400 according to the present embodiment. In base station 400 illustrated in FIG. 15, controller 401 determines second thresholds (for example, MCS thresholds used for modulation or demodulation of data) based on first thresholds (for example, MCS thresholds configured by the higher layer signal) used for determination of the mapping of a reference signal (for example, a PT-RS) (for example, for determination of the mapping density). Reception section 407 receives the reference signal mapped based on the second thresholds.

[Configuration of Mobile Station]

Figure 16:
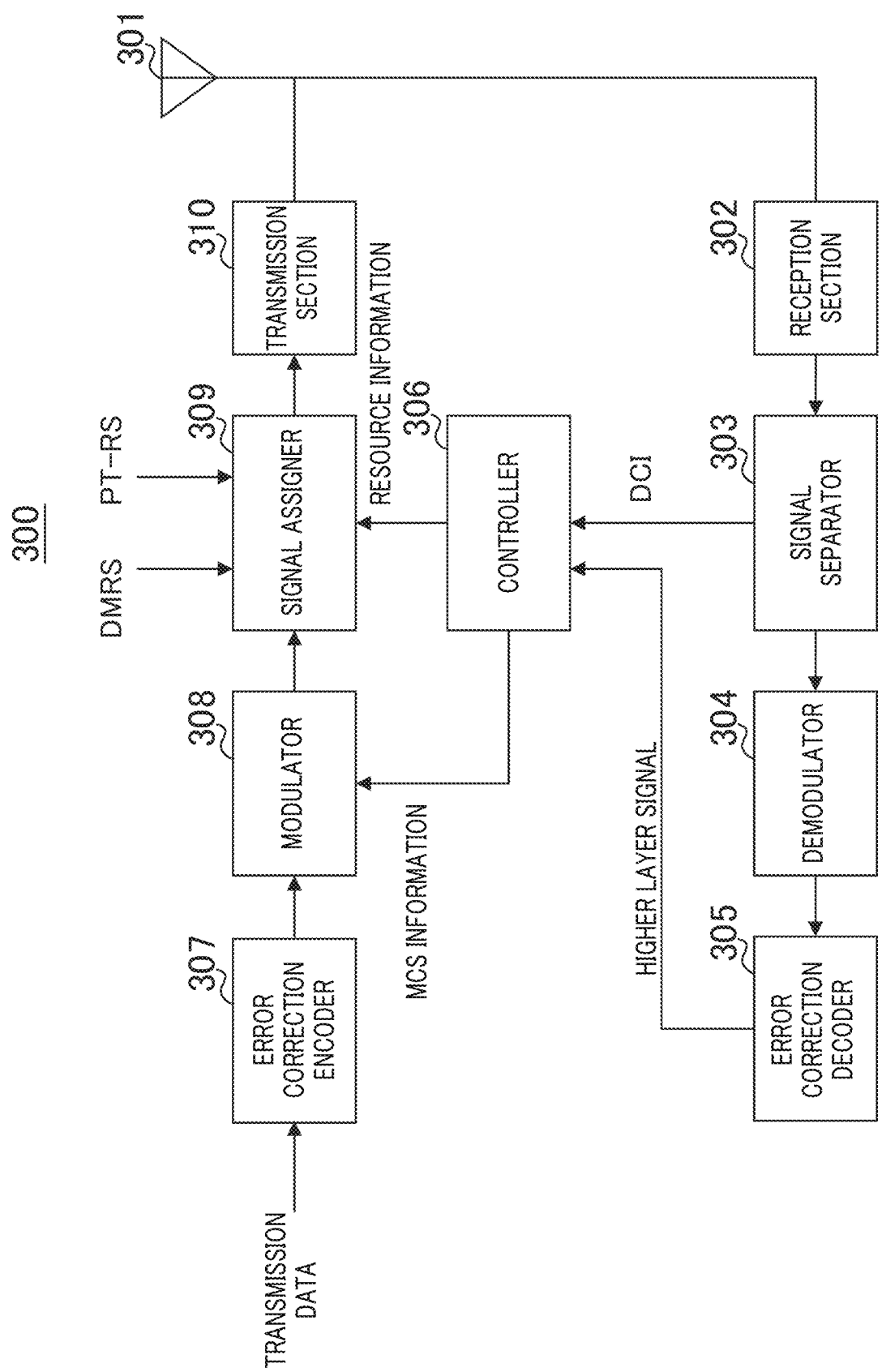
FIG. 16 is a block diagram illustrating an example of the configuration of the mobile station according to Embodiment 2.

FIG. 16 is a block diagram illustrating an example of the configuration of mobile station 300 (transmitter) according to the present embodiment. In FIG. 16, mobile station 300 includes antenna 301, reception section 302, signal separator 303, demodulator 304, error correction decoder 305, controller 306, error correction encoder 307, modulator 308, signal assigner 309, and transmission section 310.

Antenna 301 radiates a signal inputted from transmission section 310 toward base station 400. In addition, antenna 301 receives a signal transmitted from base station 400 and outputs the received signal to reception section 302.

Reception section 302 performs radio reception processing, such as frequency conversion, on the received signal inputted from antenna 301, and outputs the signal after the radio reception processing to signal separator 303.

Signal separator 303 separates DCI and a data signal (including, for example, a higher layer signal) from the signal inputted from reception section 302, outputs the DCI to controller 306, and outputs the data signal to demodulator 304.

Demodulator 304 demodulates the data signal inputted from signal separator 303 and outputs the demodulated signal to error correction decoder 305.

Error correction decoder 305 decodes the demodulated signal inputted from demodulator 304, extracts the obtained reception data signal, and outputs the obtained higher layer signal to controller 306.

Based on the information included in the higher layer signal inputted from error correction decoder 305, controller 306 determines the type of MCS index table and the MCS thresholds configured for mobile station 300.

Controller 306 also determines the traffic type (e.g., eMBB or URLLC) of the data, a scheduled MCS (e.g., MCS index), and resource allocation for each signal based on the DCI inputted from signal separator 303 or the information included in the DCI. Controller 306 outputs MCS information indicating the MCS specified by the determined MCS index to modulator 308, and outputs resource information indicating the resource allocation to signal assigner 309.

Further, when the traffic type is URLLC and the MCS index table configured for mobile station 300 by the higher layer signal differs from the MCS index table (for example, MCS index table 3) used in transmission of URLLC data, for example, controller 306 replaces, with values corresponding to the MCS index table used in transmission of the URLLC data (for example, the URLLC-data PT-RS MCS thresholds), the MCS thresholds configured by the higher layer signal. Then, controller 306 derives the PT-RS mapping density based on the replacing MCS thresholds and the MCS index indicated by the DCI, determines resources for assignment of PT-RSs using the derived mapping density, and outputs the determined allocation resources to signal assigner 309. Note that, the configuration method for configuring the URLLC-data PT-RS MCS thresholds will be described in detail below.

Error correction encoder 307 performs error correction coding on an inputted transmission data signal (in other words, uplink data), and outputs the signal after the error correction coding to modulator 308.

Modulator 308 performs modulation processing on the signal inputted from error correction encoder 307 based on the MCS information inputted from controller 306, and outputs the modulated signal to signal assigner 309.

Signal assigner 309 maps, for example, the signal inputted from modulator 308 (the transmission data signal) or a reference signal (e.g., DMRS or PT-RS) in the time-frequency domain, and outputs the mapped signal to transmission section 310. At this time, signal assigner 309 maps (assigns) signals to the resources based on the resource information inputted from controller 306.

Transmission section 310 performs radio transmission processing such as frequency conversion using a carrier wave on the signal inputted from signal assigner 309, and outputs the signal after the radio transmission processing to antenna 301.

[Configuration of Base Station]

Figure 17:
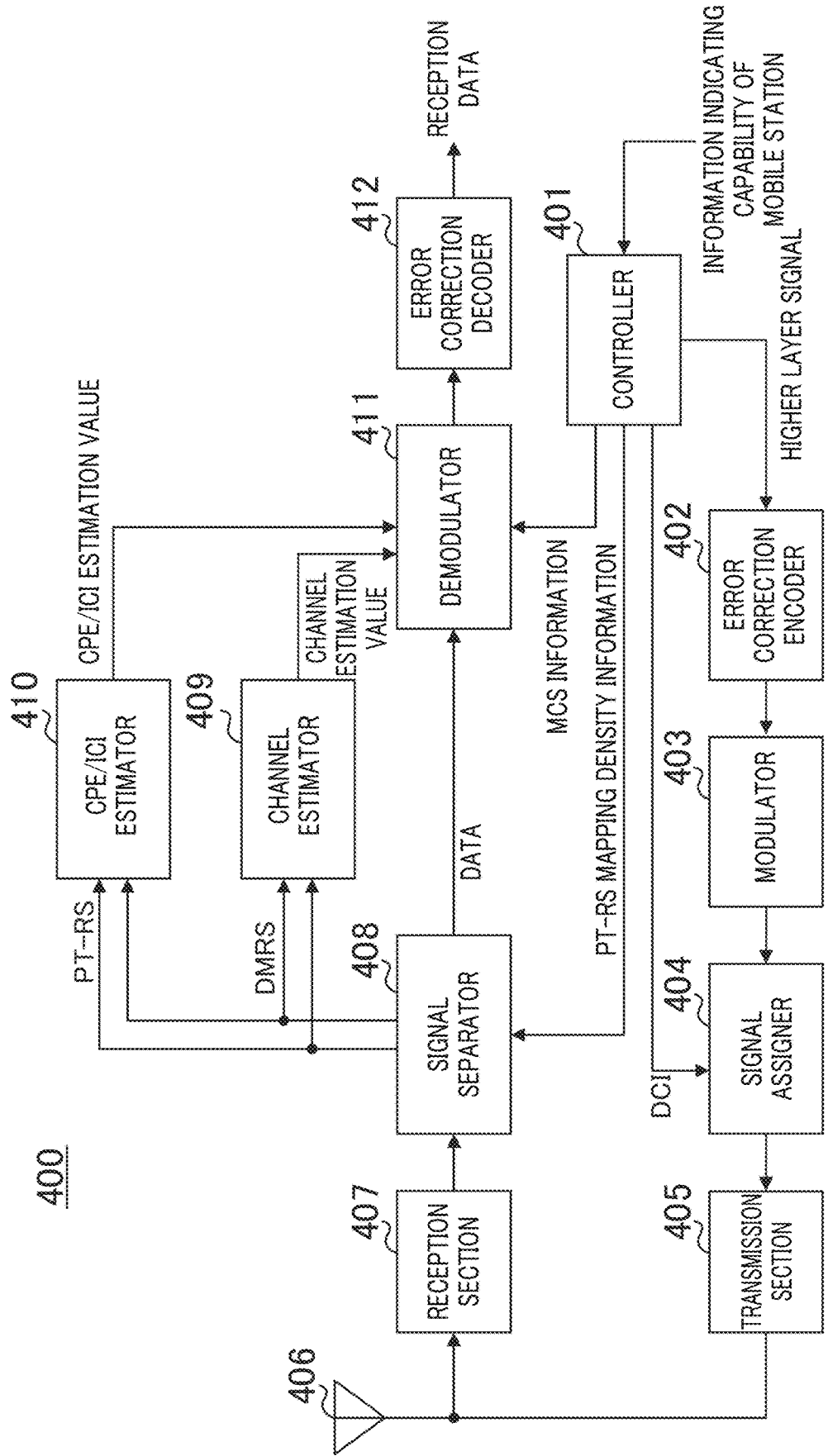
FIG. 17 is a block diagram illustrating an example of the configuration of the base station according to Embodiment 2.

FIG. 17 is a block diagram illustrating an example of the configuration of base station 400 (receiver) according to the present embodiment. In FIG. 17, base station 400 includes controller 401, error correction encoder 402, modulator 403, signal assigner 404, transmission section 405, antenna 406, reception section 407, signal separator 408, channel estimator 409, CPE/ICI estimator 410, demodulator 411, and error correction decoder 412.

Information (e.g., UE capability) indicating the capability of the mobile station is inputted to controller 401. Controller 401 determines the MCS index table or MCS thresholds used by mobile station 300 based on, for example, the information indicating the capability of the mobile station. Controller 401 outputs the higher layer signal including information indicating the determined MCS index table or MCS thresholds to error correction encoder 402.

Controller 401 also determines an MCS (e.g., MCS index) or resources for assignment of signals that is/are to be used in reception of uplink data (e.g., eMBB data or URLLC data). Controller 401 outputs MCS information indicating the determined MCS to modulator 411, or outputs DCI including the determined MCS and resources to signal assigner 404.

Further, when URLLC data is received in the case where the MCS index table configured for mobile station 300 by the higher layer signal is different from the MCS index table (for example, MCS index table 3) to be used in reception of URLLC data, controller 401 replaces, with values corresponding to the MCS index table used in reception of URLLC data (for example, "URLLC-data PT-RS MCS thresholds"), the MCS thresholds configured for mobile station 300 by the higher layer signal. Then, controller 401 derives the PT-RS mapping density based on the replacing MCS thresholds and the value of the MCS index indicated to mobile station 300 by the DCI, and outputs PT-RS mapping density information indicating the derived mapping density to signal separator 408. Note that, the configuration method for configuring the URLLC-data PT-RS MCS thresholds will be described in detail below.

Error correction encoder 402 performs error correction coding on the higher layer signal inputted from controller 401, and outputs the signal after the error correction coding to modulator 403.

Modulator 403 performs modulation processing on the signal inputted from error correction encoder 402, and outputs the modulated signal to signal assigner 404.

Signal assigner 404 maps the signal inputted from modulator 403 and the DCI inputted from controller 401 in the time-frequency domain, and outputs the mapped signal to transmission section 405.

Transmission section 405 performs radio transmission processing such as frequency conversion using a carrier wave on the signal inputted from signal assigner 404, and outputs the signal after the radio transmission processing to antenna 406.

Antenna 406 receives the signal transmitted from mobile station 300 (see FIG. 16) and outputs the received signal to reception section 407. In addition, antenna 406 radiates (transmits) the signal inputted from transmission section 405 toward mobile station 300.

Reception section 407 performs radio reception processing, such as frequency conversion, on the received signal inputted from antenna 406, and outputs the signal after the radio reception processing to signal separator 408.

Signal separator 408 identifies the position in the time-frequency domain in which the data signal, DMRS, or PT-RS in the signal inputted from reception section 407 is mapped, and separates the data signal, DMRS, or PT-RS. At this time, signal separator 408 separates the PT-RS based on the PT-RS mapping density information inputted from controller 401, which will be described below. Signal separator 408 outputs, of the separated signals, the data signal to demodulator 411, the DMRS to channel estimator 409 and CPE/ICI estimator 410, and the PT-RS to channel estimator 409 and CPE/ICI estimator 410.

Channel estimator 409 estimates a channel using the DMRS inputted from signal separator 408, and outputs a channel estimation value to demodulator 411. At this time, channel estimator 409 may estimate the channel using the PT-RS.

CPE/ICI estimator 410 estimates CPE/ICI using the PT-RS and DMRS inputted from signal separator 408, and outputs a CPE/ICI estimation value to demodulator 411.

Demodulator 411 demodulates the data signal inputted from signal separator 408 using the MCS information inputted from controller 401, the channel estimation value inputted from channel estimator 409, and the CPE/ICI estimation value inputted from CPE/ICI estimator 410. Demodulator 411 outputs the demodulated signal to error correction decoder 412.

Error correction decoder 412 decodes the demodulated signal inputted from demodulator 411 and outputs the obtained reception data signal.

[Operation of Mobile Station 300 and Base Station 400]

Next, the operation of mobile station 300 (see FIG. 16) and base station 400 (see FIG. 17) will be described in detail.

Figure 18:
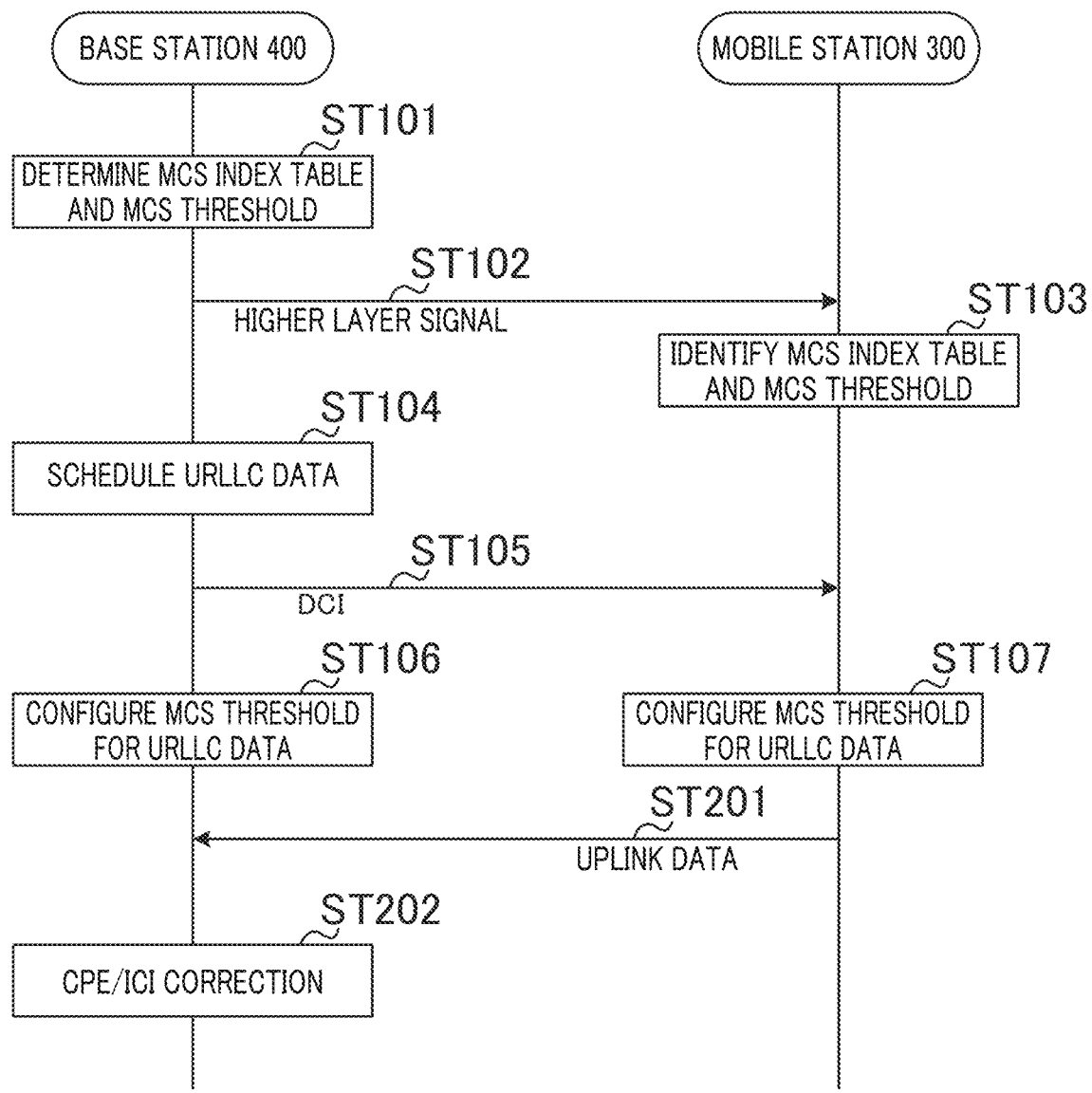
FIG. 18 is a sequence diagram illustrating a configuration example of configuration by the base station and the mobile station according to Embodiment 2.

FIG. 18 is a sequence diagram illustrating exemplary processing of mobile station 300 and base station 400. Note that the same processes between Embodiment 1 (e.g., FIG.

11) and the present embodiment are provided with the same reference symbols, and descriptions of such processes are omitted in FIG. 18.

In FIG. 18, mobile station 300 transmits uplink data (e.g., including URLLC data and PT-RSs) to base station 400 (ST201). Note that mobile station 300 modulates the URLLC data using an MCS listed in MCS index table 3. Further, mobile station 300 determines the PT-RS mapping density based on URLLC-data PT-RS MCS thresholds ptrs-MCSi_U configured at ST107.

Base station 400 performs CPE/ICI correction using the PT-RSs on the uplink data transmitted from mobile station 300, and demodulates the uplink data (ST202). Note that, base station 400 identifies the PT-RS mapping density in the uplink data based on URLLC-data PT-RS MCS thresholds ptrs-MCSi_U configured at ST106.

Next, the configuration method for mobile station 300 and base station 400 to configure the URLLC-data PT-RS MCS thresholds (for example, processing of ST106 and ST107 in FIG. 18) will be described in detail.

In the following description, by way of example, MCS index table 2 is configured for mobile station 300 by the higher layer signal. In addition, MCS thresholds (ptrs-MCSi (e.g., i=1 to 3)) suitable for MCS index table 2 are configured for mobile station 300 by the higher layer signal. Mobile station 300 and base station 400 use MCS index table 3 regardless of the configuration by the higher layer signal when transmitting and receiving URLLC data, for example.

In addition, the following description will be given of a case where mobile station 300 transmits, to base station 400 configured with the use of MCS index table 2 by the higher layer signal, data of which the traffic type is URLLC, and, the PT-RS using a high-frequency band and a high modulation order, for example.

In this case, mobile station 300 and base station 400 configure, as the URLLC-data PT-RS MCS thresholds (ptrs-MCSi_U), MCS indexes in MCS index table 3 used for modulation or demodulation of URLLC data based on MCSes (e.g., modulation orders or spectral efficiencies) corresponding to MCS indexes corresponding to the MCS thresholds configured by the higher layer signal.

For example, mobile station 300 and base station 400 select, from MCS index table 3 used for modulation or demodulation of URLLC data, MCS indexes corresponding to MCSes having values (e.g., the modulation orders or the spectral efficiencies) similar to the values of the MCSes corresponding to the MCS indexes corresponding to the MCS thresholds configured by the higher layer signal, and configure the selected MCS indexes as URLLC-data PT-RS MCS thresholds.

Mobile station 300 and base station 400 use the URLLC-data PT-RS MCS thresholds for deriving the URLLC-data PT-RS mapping density.

Hereinafter, configuration example 3 and configuration example 4 for configuring the URLLC-data PT-RS MCS thresholds will be described.

Configuration Example 3

In configuration example 3, in the uplink of the CP-OFDM signal waveform, mobile station 300 and base station 400 configure MCS indexes in MCS index table 3 as the URLLC-data PT-RS MCS thresholds based on "spectral efficiencies (SE)" corresponding to MCS indexes in MCS index table 2 corresponding to MCS thresholds configured by the higher layer signal.

Note that, in configuration example 3, the operation for configuring the URLLC-data PT-RS MCS thresholds based on the values of ptrs-MCSi (i=1, 2, and 3) configured by the higher layer signal is the same as in configuration example 1.

For example, mobile station 300 configures, as URLLC MCS thresholds, the MCS indexes in MCS index table 3 corresponding to the spectral efficiencies (SE) similar (e.g., equal or close) to the spectral efficiencies (SE) corresponding to the MCS indexes in MCS index table 2 corresponding to ptrs-MCSi configured for mobile station 300.

With this configuration, mobile station 300 identifies the relationship (see e.g., FIG. 13) between the MCS index ($I_{MCS}$) and the PT-RS time domain density ($L_{PT-RS}$) at the time of transmission/reception of URLLC data. Mobile station 300 derives the URLLC PT-RS time domain density based on the identified relationship between the MCS index ($I_{MCS}$) and the PT-RS time domain density ($L_{PT-RS}$) at the time of transmission/reception of URLLC data.

Mobile station 300 maps the PT-RSs prepared based on the above procedure to the resources, and transmits the PT-RSs to base station 400.

Meanwhile, base station 400 determines to use MCS index table 3 when demodulating the URLLC data transmitted from mobile station 300. When base station 400 determines the URLLC-data PT-RS mapping density, the base station replaces, with the values of the URLLC-data PT-RS MCS thresholds (e.g., ptrs-MCSi_U (i=1, 2, and 3)), the values of ptrs-MCSi (i=1, 2, and 3) configured for mobile station 300 by the higher layer signal in the same manner as mobile station 300.

Then, base station 400 receives the PT-RSs mapped to the resources according to the derived time domain density, and demodulates (e.g., performs CPE/ICI correction on) the URLLC data using the received PT-RSs.

As is understood, according to configuration example 3 as in configuration example 1 (the case of downlink), it is possible to suitably map URLLC PT-RSs in uplink without causing an increase in the overhead of the higher layer signal. Further, configuration example 3 can achieve similar URLLC PT-RS mapping densities and similar CPE/ICI estimation accuracies with respect to similar spectral efficiencies between eMBB and URLLC, for example.

Configuration Example 4

In configuration example 4, in the uplink of the CP-OFDM signal waveform, mobile station 300 and base station 400 configure MCS indexes in MCS index table 3 as the URLLC-data PT-RS MCS thresholds based on "modulation orders" corresponding to MCS indexes in MCS index table 2 corresponding to MCS thresholds configured by the higher layer signal.

Note that, in configuration example 4, the configuration method for the URLLC MCS thresholds differs from the configuration method in configuration example 3, which will be described below. Meanwhile, operations other than the configuration method for mobile station 300 and base station 400 to configure the URLLC MCS thresholds are the same between configuration examples 3 and 4, and such operations will thus not be described.

Note also that, in configuration example 4, the operation for configuring the URLLC-data PT-RS MCS thresholds based on the values of ptrs-MCSi (i=1, 2, and 3) configured by the higher layer signal is the same as in configuration example 2.

For example, mobile station 300 and base station 400 configure, as URLLC MCS thresholds, MCS indexes in MCS index table 3 corresponding to modulation orders ($Q_m$) similar to modulation orders corresponding to MCS indexes in MCS index table 2 corresponding to ptrs-MCSi configured for mobile station 300.

Thus, according to configuration example 4 as in configuration example 2, it is possible to suitably map URLLC PT-RSs without causing an increase in the overhead of the higher layer signal. Further, configuration example 4 can achieve similar URLLC PT-RS mapping densities and similar CPE/ICI estimation accuracies with respect to similar modulation orders between eMBB and URLLC, for example.

Configuration example 3 and configuration example 4 have been described above.

As described above, in the present embodiment, mobile station 300 determines the URLLC-data PT-RS MCS thresholds based on the MCS thresholds configured for mobile station 300 by the higher layer signal, and transmits PT-RSs mapped based on the URLLC-data PT-RS MCS thresholds. In addition, base station 400 determines the URLLC-data PT-RS MCS thresholds based on the MCS thresholds configured for mobile station 300 by the higher layer signal, and receives the PT-RSs mapped based on the URLLC-data PT-RS MCS thresholds.

Thus, according to the present embodiment, it is possible to suitably map URLLC PT-RSs in the uplink without causing an increase in the overhead of the higher layer signal. Further, according to the present embodiment, when URLLC data is transmitted or received, it is possible to achieve similar PT-RS mapping density and similar CPE/ICI estimation accuracy with respect to an MCS similar to the MCS configured by the higher layer signal (e.g., the MCS for eMBB).

Note that, in configuration example 3 or configuration example 4, MCSes having the same contents as contents (e.g., the modulation orders or the spectral efficiencies) of the MCSes corresponding to the MCS thresholds in the MCS index table configured by the higher layer signal may not exist in the MCS index table used for modulation or demodulation of URLLC data. In this case, mobile station 300 and base station 400 may configure, as the URLLC-data PT-RS MCS thresholds, MCS indexes corresponding to greater values (or smaller values) approximating the contents of the MCSes corresponding to the MCS thresholds in the MCS index table configured by the higher layer signal.

For example, in configuration example 3, when spectral efficiency equal to the spectral efficiency (SE) corresponding to ptrs-MCSi in MCS index table 2 does not exist in MCS index table 3, the greatest value (or smallest value) among the MCS indexes in MCS index table 3 corresponding to "highest SE of those which are equal to or lower than SE corresponding to ptrs-MCSi in MCS index table 2" or the smallest value (or greatest value) among the MCS indexes in MCS index table 3 corresponding to "lowest SE of those which are equal to or higher than SE corresponding to ptrs-MCSi in MCS index table 2" among the spectral efficiencies (SEs) corresponding to the MCS indexes included in MCS index table 3 may be configured as the URLLC MCS threshold.

Similarly, in configuration example 4, when modulation order $Q_m$ equal to modulation order $Q_m$ corresponding to ptrs-MCSi in MCS index table 2 does not exist in MCS index table 3, the greatest value (or smallest value) among the MCS indexes in MCS index table 3 corresponding to "highest $Q_m$ of those which are equal to or lower than $Q_m$ corresponding to ptrs-MCSi in MCS index table 2" or the smallest value (or greatest value) among the MCS indexes in MCS index table 3 corresponding to "lowest $Q_m$ of those which are equal to or higher than $Q_m$ corresponding to ptrs-MCSi in MCS index table 2" among modulation orders $Q_m$ corresponding to the MCS indexes listed in MCS index table 3 may be configured as the URLLC MCS threshold, for example.

In any of the above cases, the PT-RS mapping density does not become unnecessarily low, and it is thus possible to prevent a decrease in the CPE/ICI estimation accuracy when a smaller MCS index is selected. On the other hand, when a larger MCS index is selected, the PT-RS mapping density does not become unnecessarily high, and it is thus possible to prevent an unnecessary increase in the PT-RS overhead.

Embodiment 3

In the present embodiment, MCSes (or MCS indexes) having MCSes (e.g., modulation orders or spectral efficiencies) similar to MCSes of MCS indexes corresponding to MCS thresholds configured by the higher layer signal are selected from MCS index table 3 used for modulation or demodulation of URLLC data, and the selected MCS indexes which are further given an offset are configured as URLLC-data PT-RS MCS thresholds ptrs-MCSi_U.

To begin with, configuration example 5 and configuration example 6 for configuring the URLLC-data PT-RS MCS thresholds in downlink will be described.

Note that a base station and a mobile station according to configuration example 5 and configuration example 6 respectively have the same basic configurations as base station 100 and mobile station 200 according to Embodiment 1, and will thus be described with reference to FIGS. 9 and 10.

Note also that, in the following description, by way of example, MCS index table 2 is configured for mobile station 200 by the higher layer signal. In addition, MCS thresholds (ptrs-MCSi (e.g., i=1 to 3)) suitable for MCS index table 2 are configured for mobile station 200 by the higher layer signal. Base station 100 and mobile station 200 use MCS index table 3 regardless of the configuration by the higher layer signal when transmitting and receiving URLLC data, for example.

In addition, the following description will be given of a case where base station 100 transmits, to mobile station 200 configured with the use of MCS index table 2 by the higher layer signal, data of which the traffic type is URLLC, and, the PT-RS using a high-frequency band and a high modulation order, for example.

Configuration Example 5

In configuration example 5, in the downlink of the CP-OFDM signal waveform, base station 100 and mobile station 200 select MCS indexes in MCS index table 3 based on "spectral efficiencies (SE)" corresponding to MCS indexes in MCS index table 2 corresponding to MCS thresholds configured by the higher layer signal, and configure, as the URLLC-data PT-RS MCS thresholds, the selected MCS indexes that are further given an offset (for example, values smaller than the selected MCS indexes).

Note that, in configuration example 5, the configuration method for the URLLC MCS thresholds differs from the configuration method in configuration example 1 of Embodiment 1. Meanwhile, operations other than the configuration method for base station 100 and mobile station 200 to configure the URLLC MCS thresholds are the same between configuration example 1 of Embodiment 1 and configuration example 5, and such operations will thus not be described.

For example, base station 100 and mobile station 200 select MCS indexes in MCS index table 3 corresponding to spectral efficiencies similar to spectral efficiencies (SE) corresponding to MCS indexes in MCS index table 2 corresponding to ptrs-MCSi configured for mobile station 200. Then, base station 100 and mobile station 200 configure, as the URLLC MCS thresholds, MCS indexes in MCS index table 3 which are smaller by a predetermined value than the selected MCS indexes.

Here, by way of example, a description will be given in relation to a case where MCS index table 2 and MCS threshold ptrs-MCS1=11 are configured by the higher layer signal.

In this case, with reference to MCS index table 2 (e.g., FIG. 2) configured by the higher layer signal, base station 100 and mobile station 200 confirm the value=2.7305 of spectral efficiency (SE) corresponding to MCS index ($I_{MCS}$)=11 corresponding to MCS threshold ptrs-MCS1.

Next, with reference to MCS index table 3 (e.g., FIG. 3) used for modulation of URLLC data, base station 100 and mobile station 200 confirm MCS index ($I_{MCS}$)=22 corresponding to spectral efficiency (SE)=2.7305 equal to the spectral efficiency (SE) corresponding to MCS index ($I_{MCS}$)=11 in MCS table 2.

Base station 100 and mobile station 200 configure, as URLLC MCS threshold ptrs-MCS1_U, MCS index ($I_{MCS}$)=15 in MCS index table 3, which is a value smaller by a predetermined value (e.g., 7) than MCS index ($I_{MCS}$)=22. Base station 100 and mobile station 200 store ptrs-MCS1_U. Note that, the predetermined value (in other words, an offset value) is not limited to 7, and may be another value.

Base station 100 and mobile station 200 also replace ptrs-MCS2 and ptrs-MCS3 by URLLC MCS thresholds ptrs-MCS2_U and ptrs-MCS3_U, and store ptrs-MCS2_U and ptrs-MCS3_U.

Here, the frequency utilization efficiency (SE) corresponding to MCS index ($I_{MCS}$)=15 is "1.3281" in MCS index table 3 illustrated in FIG. 3, for example. Accordingly, in the case of URLLC-data PT-RS MCS threshold ptrs-MCS1_U=15, and when the relationship illustrated in FIG. 13 is referred to, PT-RSs are not mapped in the case of MCSes corresponding to "SE<1.3281" (corresponding to "PT-RS is not present") while PT-RSs are mapped in the case of other MCSes (e.g., MCS index≥ptrs-MCS1_U=15) (e.g., corresponding to $L_{PT-RS}$=1, 2 or 4).

Thus, when URLLC data is transmitted or received, the PT-RS mapping density is higher in the case of configuration of similar MCSes than in the case where the MCS thresholds configured by the higher layer signal are used (for example, in the case of transmission/reception of eMBB data).

Therefore, it is possible to transmit or receive data more reliably in transmission/reception of URLLC data than in transmission/reception of eMBB data.

As is understood, according to configuration example 5, even when the MCS index table configured by the higher layer signal differs from the MCS index table referred to for modulation or demodulation of data, the PT-RS mapping suitable for the MCS used for modulation or demodulation of data is configured.

In addition, according to configuration example 5, since the PT-RS mapping density is configured to be higher in the case of URLLC than in the case of eMBB even when similar MCSes are indicated, the reliability of the data transmission in URLLC can be relatively high.

Configuration Example 6

In configuration example 6, in the downlink of the CP-OFDM signal waveform, base station 100 and mobile station 200 select MCS indexes in MCS index table 3 based on "modulation orders" corresponding to MCSes in MCS index table 2 corresponding to MCS thresholds configured by the higher layer signal, and configure, as the URLLC-data PT-RS MCS thresholds, the selected MCS indexes that are further given an offset (for example, values smaller than the selected MCS indexes).

Note that, in configuration example 6, the configuration method for the URLLC MCS thresholds differs from the configuration method in configuration example 2 of Embodiment 1. Meanwhile, operations other than the configuration method for base station 100 and mobile station 200 to configure the URLLC MCS thresholds are the same between configuration example 2 of Embodiment 1 and configuration example 6, and such operations will thus not be described.

For example, base station 100 and mobile station 200 select MCS indexes in MCS index table 3 corresponding to modulation orders similar to modulation orders ($Q_m$) corresponding to MCS indexes in MCS index table 2 corresponding to ptrs-MCSi configured for mobile station 200. Then, base station 100 and mobile station 200 configure, as the URLLC MCS thresholds, MCS indexes in MCS index table 3 which are smaller by a predetermined value than the selected MCS indexes.

Here, by way of example, a description will be given in relation to a case where MCS index table 2 and MCS threshold ptrs-MCS1=11 are configured by the higher layer signal.

In this case, with reference to MCS index table 2 (e.g., FIG. 2) configured by the higher layer signal, base station 100 and mobile station 200 confirm the value=6 of the modulation order ($Q_m$) corresponding to MCS index ($I_{MCS}$)=11 corresponding to MCS threshold ptrs-MCS1.

Next, with reference to MCS index table 3 (e.g., FIG. 3) used for modulation of URLLC data, base station 100 and mobile station 200 confirm MCS index ($I_{MCS}$) corresponding to modulation order ($Q_m$)=6 equal to the modulation order corresponding to MCS index ($I_{MCS}$)=11 in MCS table 2. Here, any one of a plurality of MCS indexes ($I_{MCS}$) in MCS index table 3 corresponding to the equal modulation order (e.g., $Q_m$=6) may be selected. For example, among MCS indexes ($I_{MCS}$) corresponding to the equal modulation order (e.g., $Q_m$=6), the smallest MCS index=21 may be selected, the greatest MCS index=28 may be selected, or another MCS index different from the above may be selected.

Base station 100 and mobile station 200 configure, as URLLC MCS threshold ptrs-MCS1_U, MCS index ($I_{MCS}$)=15 in MCS index table 3, which is a value smaller by a predetermined value (e.g., 6) than the selected MCS index (e.g., $I_{MCS}$=21). Base station 100 and mobile station 200 store ptrs-MCS1_U. Note that, the predetermined value (in other words, an offset value) is not limited to 6, and may be another value.

Base station 100 and mobile station 200 also replace ptrs-MCS2 and ptrs-MCS3 with URLLC MCS thresholds ptrs-MCS2_U and ptrs-MCS3_U, and store ptrs-MCS2_U and ptrs-MCS3_U.

As is understood, according to configuration example 6, even when the MCS index table configured by the higher layer signal differs from the MCS index table referred to for modulation or demodulation of data, the PT-RS mapping for the MCS used for modulation or demodulation of data is configured.

In addition, according to configuration example 6, since the PT-RS mapping density is configured to be higher in the case of URLLC than in the case of eMBB even when similar MCSes are indicated, the reliability of the data transmission in URLLC can be relatively high.

Configuration example 5 and configuration example 6 have been described above.

Next, configuration example 7 and configuration example 8 for configuring the URLLC-data PT-RS MCS thresholds in uplink will be described.

Note that a mobile station and a base station according to configuration example 7 and configuration example 8 respectively have the same basic configurations as mobile station 300 and base station 400 according to Embodiment 1, and will thus be described with reference to FIGS. 16 and 17.

Configuration Example 7

In configuration example 7, in the uplink of the CP-OFDM signal waveform, mobile station 300 and base station 400 select MCS indexes in MCS index table 3 based on "spectral efficiencies (SE)" corresponding to MCS indexes corresponding to MCS thresholds configured by the higher layer signal, and configure, as the URLLC-data PT-RS MCS thresholds, the selected MCS indexes that are further given an offset (for example, values smaller than the selected MCS indexes).

Note that, in configuration example 7, the configuration method for the URLLC MCS thresholds differs from the configuration method in configuration example 3 of Embodiment 2. Meanwhile, operations other than the configuration method for mobile station 300 and base station 400 to configure the URLLC MCS thresholds are the same between configuration example 3 of Embodiment 2 and configuration example 7, and such operations will thus not be described.

In addition, the operation of selecting MCS indexes in an MCS index table for URLLC (for example, MCS index table 3) based on the values of ptrs-MCSi (i=1, 2, and 3) configured by the higher layer signal in configuration example 7 is the same as in configuration example 5.

For example, mobile station 300 and base station 400 select MCS indexes in MCS index table 3 corresponding to spectral efficiencies similar to spectral efficiencies (SE) corresponding to MCS indexes in MCS index table 2 corresponding to ptrs-MCSi configured for mobile station 300. Mobile station 300 and base station 400 configure, as the URLLC MCS thresholds, MCS indexes in MCS index table 3 which are smaller by a predetermined value than the selected MCS indexes.

As is understood, according to configuration example 7 as in configuration example 5 (the case of downlink), even when the MCS index table configured by the higher layer signal differs from the MCS index table referred to for modulation or demodulation of data, the PT-RS mapping suitable for the MCS used for modulation or demodulation of data is configured.

In addition, according to configuration example 7, since the PT-RS mapping density is configured to be higher in the case of URLLC than in the case of eMBB even when similar MCSes are indicated, the reliability of the data transmission in URLLC can be relatively high.

Configuration Example 8

In configuration example 8, in the uplink of the CP-OFDM signal waveform, mobile station 300 and base station 400 select MCS indexes in MCS index table 3 based on "modulation orders ($Q_m$)" corresponding to MCS indexes corresponding to MCS thresholds configured by the higher layer signal, and configure, as the URLLC-data PT-RS MCS thresholds, the selected MCS indexes that are further given an offset (for example, values smaller than the selected MCS indexes).

Note that, in configuration example 8, the configuration method for the URLLC MCS thresholds differs from the configuration method in configuration example 4 of Embodiment 2. Meanwhile, operations other than the configuration method for mobile station 300 and base station 400 to configure the URLLC MCS thresholds are the same between configuration example 4 of Embodiment 2 and configuration example 8, and such operations will thus not be described.

In addition, the operation of selecting values for URLLC (for example, for MCS index table 3) based on the values of ptrs-MCSi (i=1, 2, and 3) configured by the higher layer signal in configuration example 8 is the same as in configuration example 6.

For example, mobile station 300 and base station 400 select MCS indexes in MCS index table 3 corresponding to modulation orders similar to modulation orders ($Q_m$) corresponding to MCS indexes in MCS index table 2 corresponding to ptrs-MCSi configured for mobile station 300. Then, mobile station 300 and base station 400 configure, as the URLLC MCS thresholds, MCS indexes in MCS index table 3 which are smaller by a predetermined value than the selected MCS indexes.

As is understood, according to configuration example 8 as in configuration example 5 (the case of downlink), even when the MCS index table configured by the higher layer signal differs from the MCS index table referred to for modulation or demodulation of data, the PT-RS mapping suitable for the MCS used for modulation or demodulation of data is configured.

In addition, according to configuration example 8, since the PT-RS mapping density is configured to be higher in the case of URLLC than in the case of eMBB even when similar MCSes are indicated, the reliability of the data transmission in URLLC can be relatively high.

Configuration example 7 and configuration example 8 have been described above.

The configuration examples have been described above.

As described above, in the present embodiment, the MCS thresholds (MCS indexes) for URLLC are MCS indexes in an MCS index table used for modulation or demodulation of data which correspond to contents similar to contents of MCSes corresponding to MCS indexes corresponding to MCS thresholds configured by a higher layer signal, and which are given an offset.

Thus, according to the present embodiment, it is possible to configure PT-RS mapping density with increased reliability for an MCS similar to the MCS configured by the higher layer signal (e.g., the MCS for eMBB) so as to increase CPE/ICI estimation accuracy, for example, in transmission or reception of URLLC data.

Note that, in configuration examples 5 to 8, MCSes having the same contents as contents (e.g., the modulation orders or the spectral efficiencies) of the MCSes corresponding to the MCS thresholds in the MCS index table configured by the higher layer signal may not exist in the MCS index table used for modulation or demodulation of URLLC data. In this case, the base station (base station 100 or base station 400) and the mobile station (mobile station 200 or mobile station 300) may select MCS indexes corresponding to greater values (or smaller values) approximating the contents of the MCSes corresponding to the MCS thresholds in the MCS index table configured by the higher layer signal.

In addition, the present embodiment have been described in relation to the case where MCS indexes in an MCS index table used for modulation or demodulation of data which are similar in MCS (for example, the spectral efficiency or the modulation order) to MCSes corresponding to MCS thresholds in an MCS index table configured by the higher layer signal and which are further reduced by a predetermined value are configured as the URLLC MCS thresholds. However, the present disclosure is not limited thereto, and, for example, MCS indexes in the MCS index table used for modulation or demodulation of data which are similar in MCS to the MCSes corresponding to the MCS thresholds in the MCS index table configured by the higher layer signal and which are increased by a predetermined value may be configured as the URLLC MCS thresholds. Accordingly, for example, in transmission of URLLC data, the PT-RS mapping density does not become unnecessarily high, and it is thus possible to prevent an unnecessary increase in the PT-RS overhead.

Further, in the present embodiments, the "predetermined value" (in other words, the difference (offset) between the replacing MCS index and the newly stored MCS index) may be a preconfigured value, or may be a value configured or indicated by the higher layer signal or DCI. The amount of the predetermined value (difference) may differ depending on the type of MCS index table, or may differ depending on the combination of the type of MCS index table configured by the higher layer signal and the type of MCS index table used for modulation or demodulation of data.

By way of example, when MCS index table 1 is configured by the higher layer signal in configuration example 5, the URLLC MCS thresholds may be configured as follows.

The following example will be described in relation to a case where MCS index table 1 and MCS threshold ptrs-MCS1=17 are configured for mobile station 200 by the higher layer signal. Further, while the predetermined value is 7 between MCS index table 2 and MCS index table 3 in the above configuration examples, the predetermined value between MCS index table 1 and MCS index table 3 is 6 in the following description. Note that, the predetermined value is not limited to 6, and may be another value. Note also that, while a description is given of ptrs-MCS1 here, but the same applies to other MCS thresholds ptrs-MCS2 and ptrs-MCS3.

In this case, with reference to MCS index table 1 (e.g., FIG. 1) configured by the higher layer signal, base station 100 and mobile station 200 confirm the value=2.5664 of spectral efficiency (SE) at MCS index $(I_{MCS})$=17 corresponding to MCS threshold ptrs-MCS1.

Next, with reference to MCS index table 3 (e.g., FIG. 3) used for modulation of URLLC data, base station 100 and mobile station 200 confirm MCS index $(I_{MCS})$=21 corresponding to spectral efficiency (SE)=2.5664 equal to the spectral efficiency (SE) at MCS index $(I_{MCS})$=17 in MCS table 1.

Base station 100 and mobile station 200 configure, as URLLC MCS threshold ptrs-MCS1_U, MCS index $(I_{MCS})$=15 in MCS index table 3, which is a value smaller by a predetermined value (e.g., 6) than MCS index $(I_{MCS})$=21. Base station 100 and mobile station 200 store ptrs-MCS1_U.

It is thus possible to use more suitable MCS thresholds according to the type of MCS index table configured by the higher layer signal and the type of MCS index table used for modulation or demodulation of data.

The embodiments of the present disclosure have been described above.

Other Embodiments (1) The above-described embodiments have been described in relation to the case where ptrs-MCSi_U is configured in an MCS index table used for modulation or demodulation of data based on an MCS similar in contents (for example, the modulation order or the spectral efficiency) to an MCS corresponding to ptrs-MCSi in an MCS index table configured by the higher layer signal. However, the present disclosure is not limited to the embodiments, and an MCS index in the MCS index table used for modulation and demodulation of data which is ptrs-MCSi given an offset may be determined as ptrs-MCSi_U for URLLC data, for example, regardless of the contents of the MCS. That is, MCS threshold ptrs-MCSi_U may be determined by applying an offset to MCS threshold ptrs-MCSi. The value of the offset may be preconfigured or may be indicated by the higher layer signal or DCI. Further, the value of the offset may differ depending on combinations of the type of MCS index table configured by the higher layer signal and the type of MCS index table used for modulation or demodulation of data.

(2) The above embodiments have been described, by way of example, in relation to the case where the MCS thresholds are replaced when the traffic type of the data is URLLC. In contrast, when the traffic type of the data is not URLLC but the traffic type of the data is eMBB or mMTC, the MCS thresholds configured by the higher layer signal may be used to derive PT-RS mapping density without the MCS thresholds being replaced, for example.

Additionally or alternatively, the traffic type corresponding to the MCS index table configured by the higher layer signal is not limited to eMBB, and the traffic type assuming reference to (use of) a fixed MCS index table is not limited to URLLC. For example, when the traffic type of the data is eMBB or mMTC, or some other traffic type, or in some other condition, the MCS thresholds may be replaced.

For example, between eMBB and URLLC, MCS thresholds in MCS index table 1 or 2 (e.g., eMBB) may be replaced with MCS thresholds in MCS index table 3 (e.g., URLLC) as in the above embodiments, or the MCS thresholds in MCS index table 3 may be replaced with the MCS thresholds in MCS index table 1 or 2. Additionally or alternatively, between eMBB and eMBB, the MCS thresholds in MCS index table 1 may be replaced with the MCS thresholds in MCS index table 2, or the MCS thresholds in MCS index table 2 may be replaced with the MCS thresholds in MCS index table 1. Additionally or alternatively, the MCS thresholds may be replaced between eMBB and mMTC. Further, the MCS thresholds may be replaced in cases of other traffic types than eMBB, URLLC, or mMTC.

(3) The above-described embodiments have been described in relation to the case where the MCS index table configured by the higher layer is MCS index table 2, and the MCS index table actually referred to by the transmitter (MCS index table for URLLC) is MCS index table 3. However, the combination of the MCS index table configured by the higher layer and the MCS index table actually referred to by the transmitter is not limited to the combination of MCS index table 2 and MCS index table 3, and may be any other combination.

In addition, the MCS index tables are not limited to those illustrated in FIGS. 1, 2, and 3.

(4) The criterion for determining that the traffic type of data is URLLC is the condition that the "DCI is scrambled by the MCS-C-RNTI" in the above embodiments, but another criterion may be adopted. Further, the MCS-C-RNTI may be called "new-RNTI" or the like, for example, instead of the name "MCS-C-RNTI."

(5) In the above embodiments, when the traffic type of data is a particular type, PT-RSs may be mapped at a density that differs from PT-RS mapping density derived based on newly selected MCS thresholds ptrs-MCSi_U (i=1, 2, 3) (e.g., at an even higher or lower density). In other words, when the traffic type of data is a predetermined type, the base station and the mobile station may configure the mapping of reference signals at a higher mapping density than PT-RS mapping determined based on ptrs-MCSi_U.

For example, it is supposed that the PT-RS time domain density ($L_{PT-RS}$) derived from the values of ptrs-MCSi_U (i=1, 2, 3), the MCS index indicated by the DCI, and FIG. 13 is 2. For example, when the traffic type of the data to be transmitted and received is URLLC, PT-RSs may be mapped according to $L_{PT-RS}$=1 indicating that the PT-RS mapping density is higher than $L_{PT-RS}$=2. Thus, the PT-RS mapping density higher in URLLC than in eMBB is configured even with a similar MCS, resulting in relatively high reliability of data transmission in URLLC.

In addition, as a similar operation, when the traffic type of the data to be transmitted and received is URLLC, $L_{PT-RS}$ may also be derived based on the relationship between ptrs-MCSi_U and $L_{PT-RS}$ as illustrated in FIG. 19, which is different from that of FIG. 13 (e.g., based on different $L_{PT-RS}$ or different number of MCS thresholds), for example. In FIG. 19, $L_{PT-RS}$ is configured as values representing relatively high PT-RS mapping densities (i.e., relatively low values) as compared to FIG. 13, for example. Thus, the PT-RS mapping density higher in URLLC than in eMBB is configured even with a similar MCS, resulting in relatively high reliability of data transmission in URLLC.

In addition, as a similar operation, when the traffic type of the data to be transmitted and received is a type which does not attach much importance to the reliability of data transmission, $L_{PT-RS}$ may be configured as values representing relatively low PT-RS mapping densities (i.e., for example, as relatively large values, or "PT-RS is not present"), for example, as opposed to the above. Thus, the PT-RS mapping density does not become unnecessarily high, and it is thus possible to prevent an unnecessary increase in the PT-RS overhead.

(6) In the above embodiments, it is assumed that an MCS index other than "reserved MCS indexes" is indicated by the DCI. However, even when a "reserved MCS index" is indicated, the base station and the mobile station may change the reserved MCS index into an MCS index other than the reserved MCS indexes, and then replace the MCS index by the same method as in the above-described configuration examples.

The "reserved MCS index" is assumed to be indicated, for example, in data retransmission. In this case, the base station and the mobile station may refer to an MCS index (an MCS index other than the reserved MCS indexes) used for initial transmission of data corresponding to retransmission data corresponding to the "reserved MCS index," and perform replacement with the URLLC-data PT-RS MCS threshold in the same manner as in the above-described configuration examples by using the referred MCS index.

(7) PT-RS MCS thresholds ptrs-MCSi_U (i=1, 2, 3) used for CPE/ICI estimation of data of a particular traffic type may not be configured by the higher layer signal, and may not be derived or determined by the method described in the above embodiments, but may be pre-configured values in the specifications, for example.

(8) The above-described embodiments have been described in conjunction with replacement (conversion) between MCS thresholds in different MCS index tables. However, in the present disclosure, the MCS thresholds may be replaced in the same MCS index table. For example, different MCS thresholds in the same MCS index table may be applied respectively for different traffic types. For example, the base station and the mobile station may configure the URLLC-data PT-RS MCS thresholds in the same MCS index table based on MCS thresholds configured by the higher layer signal (e.g., for eMBB).

(9) The methods in the respective configuration examples of the above embodiments are not limited to derivation or determination of the PT-RS time domain density, and may be applied to derivation or determination of PT-RS frequency domain density.

(10) In the configuration examples of the above-described embodiments, the information on the capability and the like of the mobile station may be reported in advance, for example, from the mobile station to the base station by the higher layer signal, an uplink control signal (UCI: Uplink Control Information), or the like.

(11) The term "CPE/ICI correction" as used in the above embodiments means "correcting CPE," "correcting ICI," or "correcting both CPE and ICI."

The term "traffic type" as used in the above embodiments may be replaced with another term such as "service type," "target scenario," "target use case," or the like, for example.

The term "higher layer signal" as used in the above embodiments may be replaced with another term such as "Radio Resource Control (RRC) signal," "RRC signaling," or the like, for example.

The term "MCS index table" as used in the above embodiments may be replaced with another term such as "MCS table" or the like, for example.

(12) The above embodiments have been described in relation to the case where the signal waveform of CP-OFDM is used, other signal waveforms such as DFT-S-OFDM and the like may, for example, be used. Further, the PT-RS time domain density may be a value representing, for example, the number of PT-RS groups in each symbol of the DFT-S-OFDM waveform, the number of PT-RS samples included in the PT-RS group, a combination of the number of groups and the number of samples, or the like instead of the number of symbols.

(13) In a case where control channels (Physical Downlink Control CHannel (PDCCH) and Physical Uplink Control CHannel (PUCCH)) and data channels (Physical Downlink Shared CHannel (PDSCH) and Physical Uplink Shared CHannel (PUSCH)) are frequency-multiplexed, PT-RSs may be mapped to its symbols.

(14) The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a radio LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A transmitter in an exemplary embodiment of the present disclosure includes: control circuitry, which, in operation, determines a second threshold based on a first threshold used for determination of mapping of a reference signal; and transmission circuitry, which, in operation, transmits the reference signal mapped based on the second threshold.

In the transmitter in an exemplary embodiment of the present disclosure, the first threshold and the second threshold are indexes attached to a table including a plurality of candidates of a combination of a modulation scheme and a coding rate, the candidates include at least a spectral efficiency, and the control circuitry determines an index in a second table as the second threshold based on a first spectral efficiency corresponding to the first threshold in a first table.

In the transmitter in an exemplary embodiment of the present disclosure, the second threshold is an index in the second table corresponding to a highest spectral efficiency equal to or lower than the first spectral efficiency.

In the transmitter in an exemplary embodiment of the present disclosure, the second threshold is an index in the second table corresponding to a lowest spectral efficiency equal to or higher than the first spectral efficiency.

In the transmitter in an exemplary embodiment of the present disclosure, the first threshold and the second threshold are indexes attached to a table including a plurality of candidates of a combination of a modulation scheme and a coding rate, the candidates include at least a modulation order, and the control circuitry determines an index in a second table as the second threshold based on a first modulation order corresponding to the first threshold in a first table.

In the transmitter in an exemplary embodiment of the present disclosure, the second threshold is an index in the second table corresponding to a highest modulation order equal to or lower than the first modulation order.

In the transmitter in an exemplary embodiment of the present disclosure, the second threshold is an index in the second table corresponding to a lowest modulation order equal to or higher than the first modulation order.

In the transmitter in an exemplary embodiment of the present disclosure, the second threshold is determined by applying an offset to the first threshold.

In the transmitter in an exemplary embodiment of the present disclosure, the first threshold and the second threshold are indexes attached to a table including a plurality of candidates of a combination of a modulation scheme and a coding rate, and a value of the offset is any one of a preconfigured value, a value indicated by a higher layer signal or a control signal, a value configured depending on a type of the table, and a value configured depending on a combination of the first table and the second table.

In the transmitter in an exemplary embodiment of the present disclosure, when a type of data is a predetermined type, the control circuitry configures the mapping of the reference signal at a density different from that of the mapping of the reference signal determined based on the second threshold.

A receiver in an exemplary embodiment of the present disclosure includes: control circuitry, which, in operation, determines a second threshold based on a first threshold used for determination of mapping of a reference signal; and reception circuitry, which, in operation, receives the reference signal mapped based on the second threshold.

A transmission method in an exemplary embodiment of the present disclosure includes: determining a second threshold based on a first threshold used for determination of mapping of a reference signal; and transmitting the reference signal mapped based on the second threshold.

A reception method in an exemplary embodiment of the present disclosure includes: determining a second threshold based on a first threshold used for determination of mapping of a reference signal; and receiving the reference signal mapped based on the second threshold.

This application is entitled to and claims the benefit of Japanese Patent Application No. 2018-177051 dated Sep. 21, 2018, the disclosure of which including the specification, drawings and abstract is incorporated herein by reference in its entirety.

INDUSTRIAL APPLICABILITY

An exemplary embodiment of the present disclosure is useful for mobile communication systems.

REFERENCE SIGNS LIST 100, 400 Base station
101, 208, 306, 401 Controller
102, 307, 402 Error correction encoder
103, 308, 403 Modulator
104, 309, 404 Signal assigner
105, 310, 405 Transmission section
106, 201, 301, 406 Antenna
200, 300 Mobile station
202, 302, 407 Reception section
203, 303, 408 Signal separator
204, 409 Channel estimator
205, 410 CPE/ICI estimator
206, 304, 411 Demodulator
207, 305, 412 Error correction decoder

The invention claimed is:

1. A transmitter, comprising:
control circuitry, which, in operation, determines a second threshold based on a first threshold used for determination of mapping of a reference signal; and
transmission circuitry, which, in operation, transmits the reference signal mapped based on the second threshold, wherein
the second threshold is determined by applying an offset to the first threshold,
the first threshold and the second threshold are indexes attached to a table including a plurality of candidates of a combination of a modulation scheme and a coding rate, and
a value of the offset is any one of a preconfigured value, a value indicated by a higher layer signal or a control signal, a value configured depending on a type of the table, and a value configured depending on a combination of a first table and a second table.

2. The transmitter according to claim 1, wherein
the first threshold and the second threshold are indexes attached to the table including the plurality of candidates of a combination of a modulation scheme and a coding rate, the candidates including at least a spectral efficiency, and
the control circuitry determines an index in the second table as the second threshold based on a first spectral efficiency corresponding to the first threshold in the first table.

3. The transmitter according to claim 2, wherein
the second threshold is an index in the second table corresponding to a highest spectral efficiency equal to or lower than the first spectral efficiency.

4. The transmitter according to claim 2, wherein
the second threshold is an index in the second table corresponding to a lowest spectral efficiency equal to or higher than the first spectral efficiency.

5. The transmitter according to claim 2, wherein
the first threshold and the second threshold are indexes attached to the table including the plurality of candidates of a combination of a modulation scheme and a coding rate, the candidates including at least a modulation order, and
the control circuitry determines an index in the second table as the second threshold based on a first modulation order corresponding to the first threshold in the first table.

6. The transmitter according to claim 5, wherein
the second threshold is an index in the second table corresponding to a highest modulation order equal to or lower than the first modulation order.

7. The transmitter according to claim 5, wherein
the second threshold is an index in the second table corresponding to a lowest modulation order equal to or higher than the first modulation order.

8. The transmitter according to claim 1, wherein,
when a type of data is a predetermined type, the control circuitry configures the mapping of the reference signal at a density different from that of the mapping of the reference signal determined based on the second threshold.

9. A receiver, comprising:
control circuitry, which, in operation, determines a second threshold based on a first threshold used for determination of mapping of a reference signal; and
reception circuitry, which, in operation, receives the reference signal mapped based on the second threshold, wherein
the second threshold is determined by applying an offset to the first threshold,
the first threshold and the second threshold are indexes attached to a table including a plurality of candidates of a combination of a modulation scheme and a coding rate, and
a value of the offset is any one of a preconfigured value, a value indicated by a higher layer signal or a control signal, a value configured depending on a type of the table, and a value configured depending on a combination of a first table and a second table.

10. A transmission method, comprising:
determining a second threshold based on a first threshold used for determination of mapping of a reference signal; and
transmitting the reference signal mapped based on the second threshold, wherein
the second threshold is determined by applying an offset to the first threshold,
the first threshold and the second threshold are indexes attached to a table including a plurality of candidates of a combination of a modulation scheme and a coding rate, and
a value of the offset is any one of a preconfigured value, a value indicated by a higher layer signal or a control signal, a value configured depending on a type of the table, and a value configured depending on a combination of a first table and a second table.

11. A reception method, comprising:
determining a second threshold based on a first threshold used for determination of mapping of a reference signal; and
receiving the reference signal mapped based on the second threshold, wherein
the second threshold is determined by applying an offset to the first threshold,
the first threshold and the second threshold are indexes attached to a table including a plurality of candidates of a combination of a modulation scheme and a coding rate, and
a value of the offset is any one of a preconfigured value, a value indicated by a higher layer signal or a control signal, a value configured depending on a type of the table, and a value configured depending on a combination of a first table and a second table.

* * * * *